United States Patent [19]
Ito

[11] Patent Number: 4,845,525
[45] Date of Patent: Jul. 4, 1989

[54] IMAGE FORMING APPARATUS FOR FORMING SPECIAL INFORMATION UPON COPYING A DOCUMENT IMAGE

[75] Inventor: Masazumi Ito, Toyohashi, Japan

[73] Assignee: Minolta Camera Kabushiki Kaisha, Osaka, Japan

[21] Appl. No.: 127,274

[22] Filed: Dec. 1, 1987

[30] Foreign Application Priority Data

Dec. 2, 1986 [JP] Japan ................................ 61-289451
Dec. 2, 1986 [JP] Japan ................................ 61-289452

[51] Int. Cl.[4] ...................... G03G 15/00; G03B 27/32; G03B 27/52

[52] U.S. Cl. .................................... 355/218; 355/244; 355/319

[58] Field of Search ........... 355/7, 14 E, 14 R, 23-25, 355/40

[56] References Cited

U.S. PATENT DOCUMENTS

| | | | |
|---|---|---|---|
| 3,914,043 | 10/1975 | McVeigh . | |
| 3,960,445 | 6/1976 | Drawe . | |
| 4,291,341 | 9/1981 | Yajima . | |
| 4,322,157 | 3/1982 | Miura et al. | 355/40 X |
| 4,582,417 | 4/1986 | Yagasaki et al. . | |
| 4,611,904 | 9/1986 | Wada . | |
| 4,627,707 | 12/1986 | Tani et al. . | |
| 4,640,601 | 2/1987 | Deguchi et al. | 355/7 X |
| 4,653,899 | 3/1987 | Watanabe . | |
| 4,702,589 | 10/1987 | Ito . | |
| 4,707,121 | 11/1987 | Sawaki et al. | 355/40 |
| 4,707,126 | 11/1987 | Ohshima et al. | 355/7 X |
| 4,708,469 | 11/1987 | Bober et al. | 355/23 X |
| 4,712,907 | 12/1987 | Weinberger et al. | 355/7 |
| 4,742,373 | 5/1988 | Nakatani . | |
| 4,743,945 | 5/1988 | Ito et al. . | |
| 4,774,546 | 9/1988 | Corona et al. | 355/14 R |
| 4,782,367 | 1/1988 | Noguchi | 355/40 |

FOREIGN PATENT DOCUMENTS

| | | | |
|---|---|---|---|
| 179868 | 11/1982 | Japan | 355/14 C |
| 202479 | 11/1984 | Japan | 355/14 R |
| 60-130782 | 7/1985 | Japan . | |
| 87166 | 5/1986 | Japan | 355/24 |

*Primary Examiner*—R. L. Moses
*Assistant Examiner*—Edward Pipala
*Attorney, Agent, or Firm*—Burns, Doane, Swecker & Mathis

[57] ABSTRACT

An image forming machine is disclosed. The image forming machine provides a duplex copy means for copying first and second images on first and second sides of a sheet, respectively, and/or a composite copy means for copying first and second images on one side of a sheet, an information writing means for forming an information at a predetermined position on a sheet and means for controlling said information writing means. Said control means automatically changes the position for writing an information upon the first and second copying in the duplex mode. If the composite copy mode is designated, the information is written only one time during the composite copy mode.

17 Claims, 31 Drawing Sheets

IMAGE FORMING APPARATUS FOR FORMING SPECIAL INFORMATION UPON COPYING A DOCUMENT IMAGE

BACKGROUND OF THE INVENTION

1. Field of the Invention

The present invention relates to a copy machine having a function for forming or writing special information upon copying a document image.

2. Description of the Prior Art

In JP-A No. 130782/1985, there is proposed an electrophotographic copy machine having a function capable of forming special information such as a page number, a date or the like upon copying a document image.

In this copy machine, a shutter means for shutting a light path of a document image toward a photoconductive drum and a data writing head comprising an LED array are provided and a desirable data such as a date is written on an area of the drum shaded by said shutter means upon copying a document image. Therefore, a copy of a document on which an image of the data is formed is obtained.

Further, a copy machine is provided having a duplex copy mode wherein first and second document images are copied on first and second sides of a copy sheet automatically and/or having a composite copy mode wherein first and second document images are copied on different areas of the same side of a copy sheet automatically.

In a copy machine having an information forming function together with the duplex copy mode and/or the composite copy mode, some inconveniences are caused as follows: In the duplex copy mode, the position of the information formed on the second side of a sheet seems unnatural when compared with that of the first side since the position is kept unchanged upon copying the second side although the relative position of the second document image in the sheet is changed with respect to the center line of the sheet, and in the composite copy mode, positions of information formed upon the first and second copying happen to be shifted with each other by a small distance since it is impossible to coincide the top position with each other exactly upon the first and second copyings.

SUMMARY OF THE INVENTION

It is an object of the present invention is to provide a copy machine wherein a position for writing information data can be changed automatically on first side and second side of a sheet in duplex copy mode.

It is another object of the present invention is to provide a copy machine wherein double data writing is inhibited in composite copy mode.

An copy machine according to the present invention comprises: a photoconductor; a first exposure means for exposing a primary image on said photoconductor; a second exposure means for exposing a secondary image on said photoconductor; said means being arranged so that an exposure position on said photoconductor can be changed; a duplex copy means for transferring a first primary image and a first secondary image onto first side of a sheet and then, transferring a second primary image and a second a secondary image onto second side of the same sheet after visualizing those images; and a control means for controlling said second exposure means in such a manner that said first secondary image is exposured at first position on said photoconductor upon copying first side of the sheet and said second secondary image is exposured at second position on said photoconductor upon copying the second- side of the sheet, said second position being different from said first position.

An image forming apparatus according to the present invention for forming first document image on one side of a sheet and forming second document image on the same side of said sheet successively which comprises: means for forming predetermined information different from said first and second document images; and control means for inhibiting operation of said means upon forming either one of said first and second document images and for operating said means upon forming the other document image.

It is an advantage of a copy machine according to the present invention that a data writing position can be specified easily when a data such as a page number is entered in the duplex copy mode.

It is an advantage of an image forming apparatus according to the present invention that the deviation of the position of an image of entered data does not arise in case of data entry in the composite copy because the data is entered only once during the composite copy.

BRIEF DESCRIPTION OF THE DRAWINGS

Further objects and advantages of the present invention will be apparent from the following description, reference being had to the accompanying drawings wherein preferred embodiments of the present invention are clearly In the drawings.

DETAILED DESCRIPTION OF THE PREFERRED EMBODIMENTS

Figure 1:
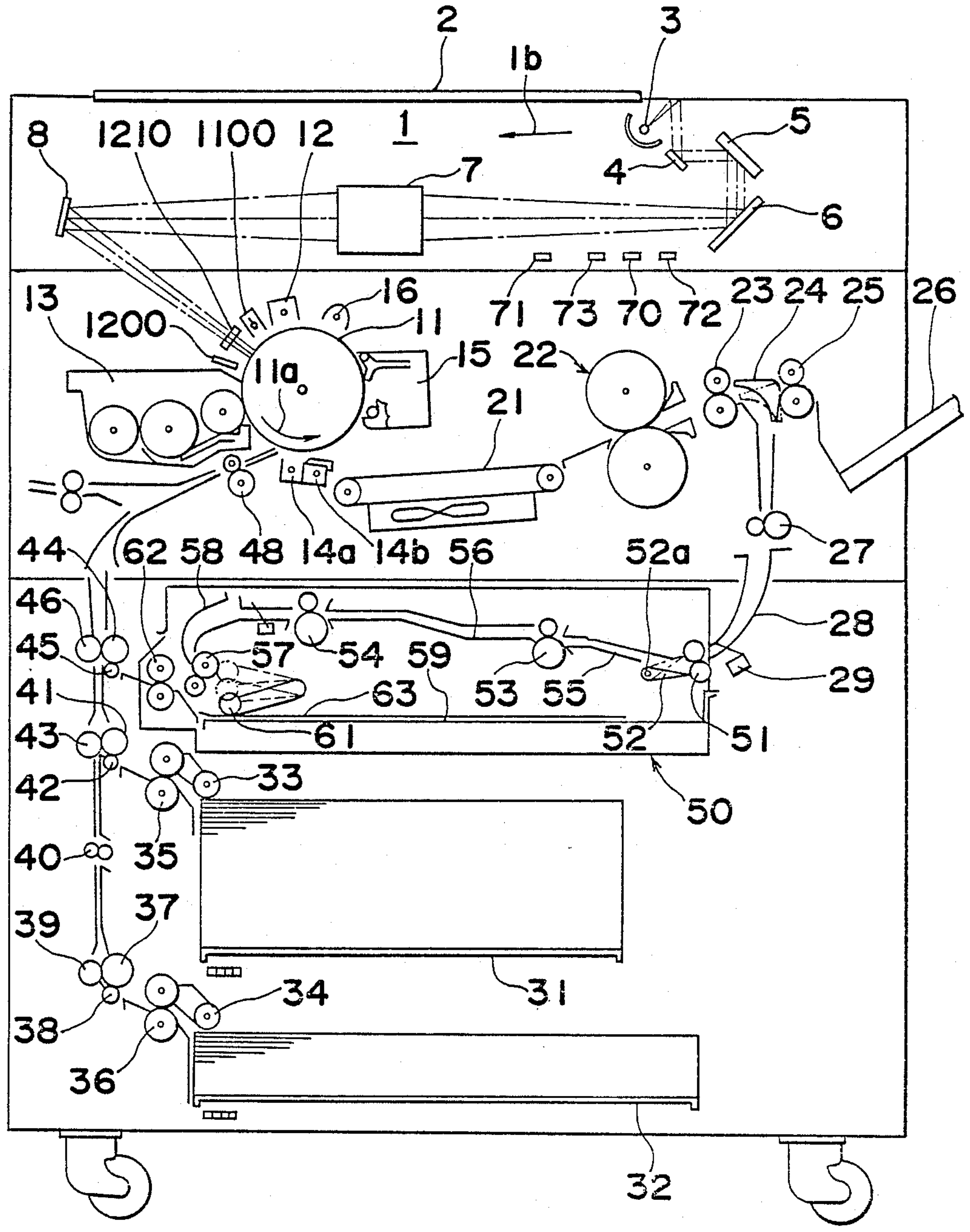
FIG. 1 is a cross-sectional view of a copy machine according to th invention.

Referring now to the drawings wherein like reference numerals designate corresponding parts throughout the drawings, preferred embodiments of the invention will be explained in the following order:

(a) construction of a copy machine,
(b) duplex copy and composite copy,
(c) operational panel,
(d) control circuit of a copy machine,
(e) mechanism for forming an image of data,
(f) editor,
(g) relation of a data image formation with duplex copy,
(h) relation of a data image formation with composite copy,
(i) control of a copy machine,
(j) control of an editor, (a) Construction of a copy machine The general construction of a copy machine according to the preferred embodiment of the present invention as well as its copy action will be explained first.

As shown in FIG. 1, the copy machine has a bottom portion including a paper stock means, a paper feeding means and an intermediate tray unit 50 arranged just above the paper stock means, a middle portion including an image forming means with a photoconductor drum 2, and a top stage including an optical system 1. This copy machine can send a paper having been copied just before to the intermediate tray unit 50 and feed the paper again so as to give a duplex copy or a composite copy.

The photoconductor drum 11 is driven to rotate in an anticlockwise direction as indicated by an arrow 11*a*. A sensitizing charger 12, a mid-image eraser 1100, a liquid-crystal shutter 1210, a writing head 1200 with a light emitting diode (LED) array, a developer 13 of magnetic brush type, a transfer charger 14*a*, a separation charger 14*b*, a cleaning unit 15 with a blade and an eraser lamp 16 are arranged around the photoconductor drum 11. The photoconductor drum 11 is sensitized homogeneously by the sensitizing charger 12 according to the rotation in the direction of arrow 11*a*, and an electrostatic latent image is formed according to the exposure of image from the optical system 1. The developer 13 develops the latent image so as to form a toner image with toners. The liquid-crystal shutter 1210 can shut the light path toward the photoconductor drum 11, and the LED writing head 1200 can write a data such as a date at an area of the photoconductor drum 11 shaded by the liquid-crystal shutter 1210. The optical system 1 arranged below a platen glass 2 is composed of an exposure lamp 3, movable mirrors 4, 5 and 6, a focusing lens 7 and a fixed mirror 8 so as to scan a document placed on the platen glass 2. A slider which carries the exposure lamp 3 and the movable mirror 4 moves at a velocity of V/m in a direction indicated by an arrow 1*b*, wherein V is a peripheral speed of the photoconductor drum 11 which is kept constant irrespective of a copy magnification power and m is a copy magnification power. On the other hand, another slider which carries the movable mirrors 5 and 6 moves at a velocity of V/2m in the direction of arrow 1*b*. Following switches are set at predetermined positions along the moving direction of the optical system 1: an eraser switch 72, a fixed position detection switch 70, an image top detection switch 73 and a resist switch 71.

The paper stock means comprises a stock tray 31 of elevator type and another tray 32 of cassette type. A paper in the stock tray 31 if it is designated is fed by a paper-feed roller 33 through a pair of rollers 35, or a paper in the stock tray 32 if it is designated is fed by a paper-feed roller 34 through rollers 36 to 40. Then, the paper is fed by rollers 41 to 46 to a pair of timing rollers 48 and is stopped there once. Then, the paper is sent to a transfer station in synchronization with the image formed on the photoconductor drum 11, and the toner image is transferred there on the paper by the transfer charger 14*a*. Then, the paper is separated from the surface of the photoconductor drum 11 by discharging with the separation charger 14*b*, and it is carried by a carrying belt 21 having an air-suction means to a fixer 22 where the toner image is fixed thermally.

A lever 24 for changing a discharge path of a paper is arranged between a pair of carrying rollers 23 and a pair of discharge rollers 25 arranged after the outlet of the fixer 22. If a paper is to be sent out directly, the lever 24 is set at a position indicated by chain line. Then, a paper sent out from the fixer 22 is carried from a pair of discharge rollers 25 to a tray 26. On the other hand, in the case of the duplex copy or the composite copy, the lever 24 is set at a position indicated by a solid line, and the paper is sent via a pair of carriage rollers 27 and a guide plate 28 into the intermediate tray unit 50.

The toner remained after the transfer on the photoconductor drum 11 is removed by the cleaning unit 15, and the remaining charge is removed by the illumination with the eraser lamp 16. Then, the photoconductor drum 11 is ready for the exposure of the next image.

(b) Duplex copy and composite copy

Duplex copy which makes use of the intermediate tray unit 50 will be explained next.

The intermediate tray unit 50 is composed of a change block, a carriage block, a reversal block, an adjustment and intermediate tray block and a paper-re-feed block.

The change block is composed of a pair of rollers 51 and a change lever 52, which is switched according to whether the paper should be reversed or not.

The carriage block is composed of two pairs of the carriage rollers 53 and 54 and guide plates 55, 56. It carries a paper in the case of duplex copy.

The reversal block is composed of a pair of carriage rollers 57 and a reversal guide 58. It reverses the side of a paper carried through the carriage block so as to send the paper to the intermediate tray 59.

The adjustment and intermediate tray block is composed of an intermediate tray 59 and a slide rail, a slide member and a limit plate (all not shown). It aligns the paper being sent in the intermediate tray 59.

The paper-re-feed block is composed of a holder (not shown), a paper-re-feed roller 61, a pair of rollers 62 and a guide plate (not shown). It feeds individual paper one by one which have been adjusted on the intermediate tray 59.

Figure 3A:
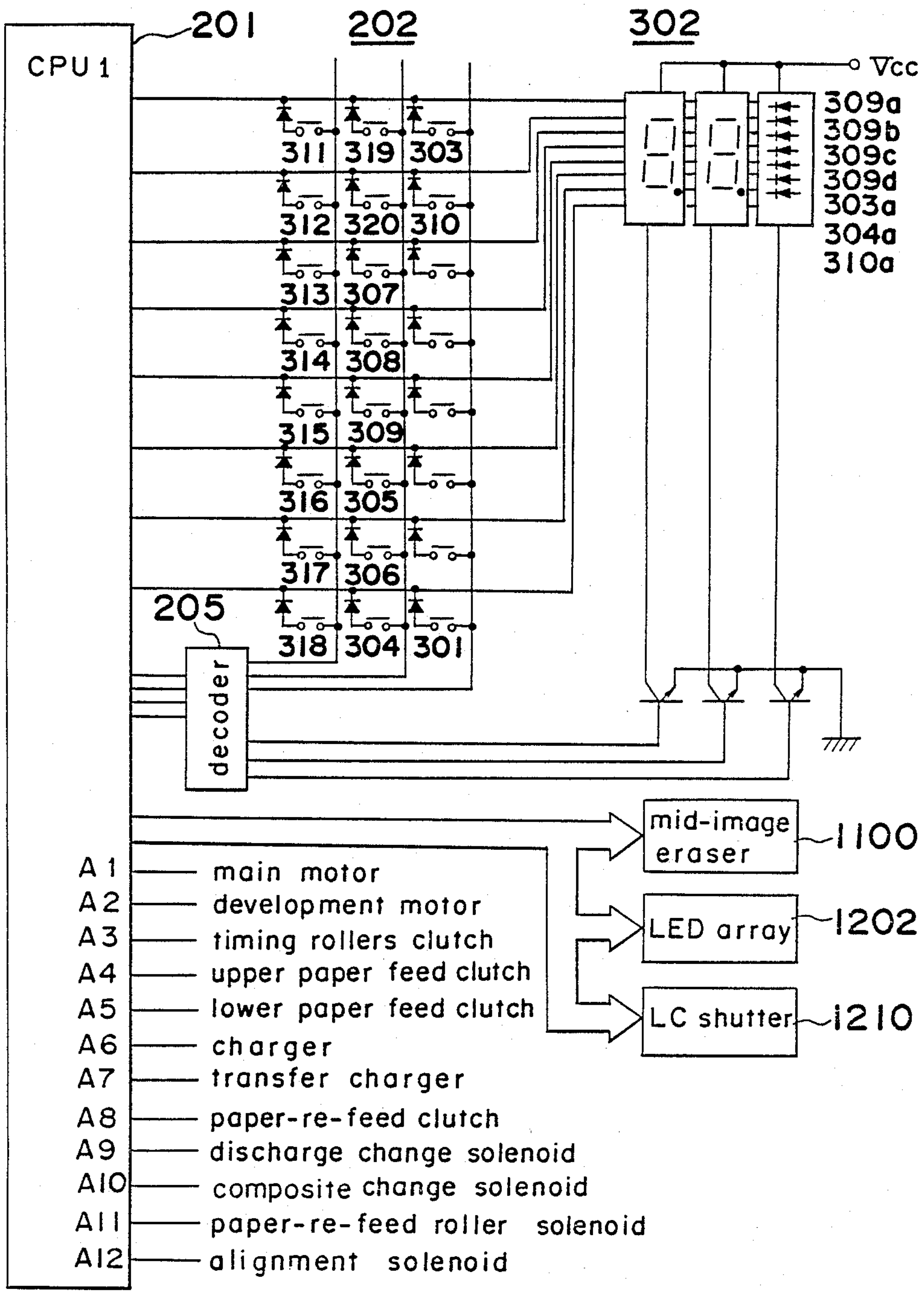
FIGS. 3(*a*) and 3(*b*) are block diagrams of control circuits for counting the copy machine, respectively.
Figure 3B:
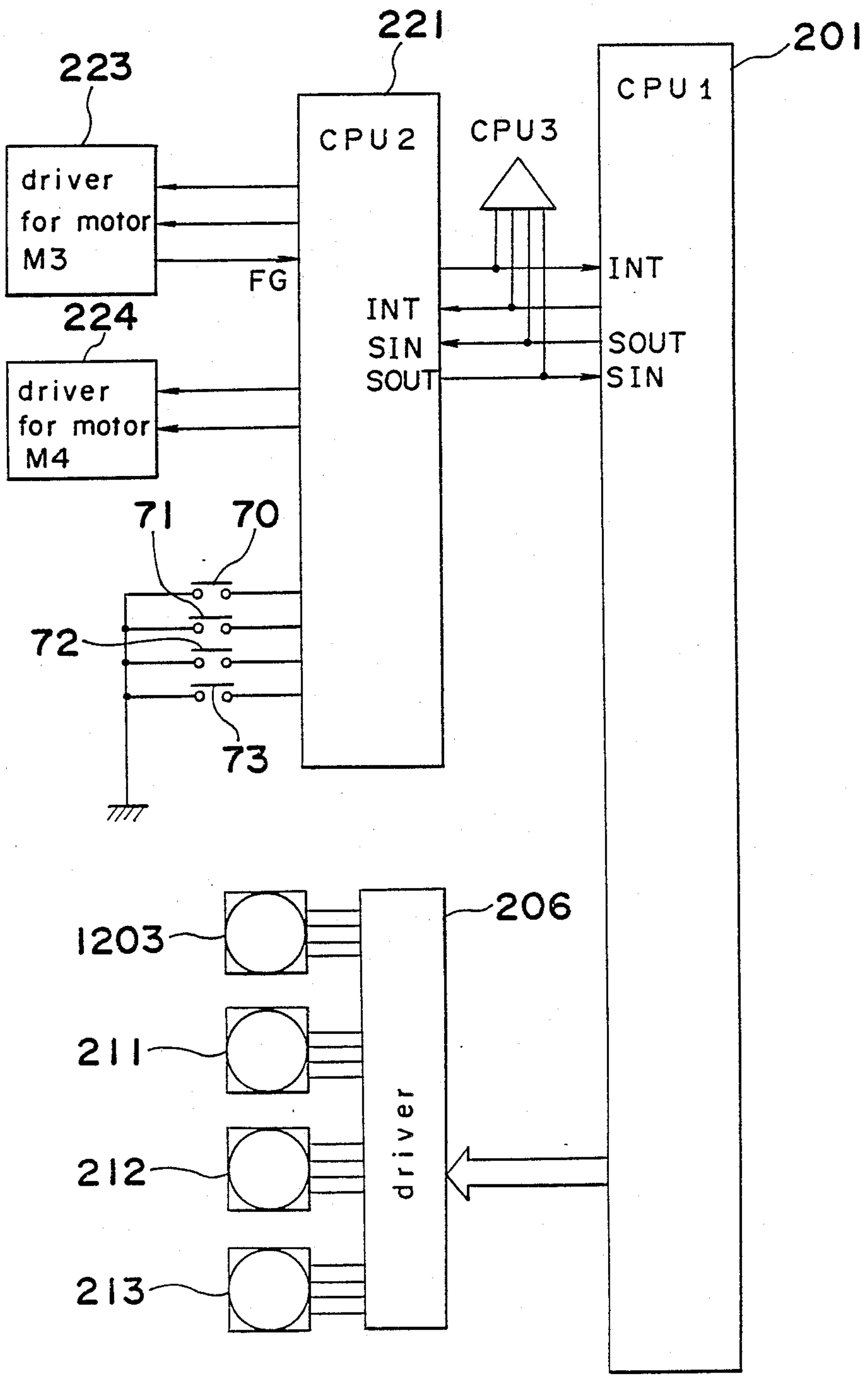

If either copy of duplex copy or the composite copy is selected by operating with a key 303 or 304 on an operation panel (refer to FIG. 3), the change lever 24 is set at the position indicated by the solid line in FIG. 1. Thus, a paper which has been copied on the first side thereof is guided from the pair of carriage rollers 27 through the guide plate 28 to the pair of carriage rollers 51.

Another change lever 52 which is supported swingably around an axis 52*a* is set at a position indicated by a solid line in FIG. 1, if the duplex copy is designated. Therefore, the paper is guided by the upper side of the change lever 52, is carried and guided by the pair of carriage rollers 51, the guide plate 55, the pair of carriage rollers 53, the guide plate 56 and the pair of carriage rollers 54 of the carriage block to the left side in FIG. 1. Then, the paper is reversed by the pair of carriage rollers 57, the reversal guide 58 and the paper-re-feed roller 61 set at an upper position indicated by a chain line so that the upper side of the paper carried on the intermediate tray 59 is the copied side. Then, the position of the paper is adjusted on the intermediate tray 59 by the aligning mechanism. The paper in the intermediate tray 59 is fed again one by one by the counterclockwise rotation of the paper-re-feed roller 61.

In the case of the composite copy mode, the change lever 52 is set at a position indicated by a chain line in FIG. 1. Thus, a paper passing the pair of roller 51 is guided by the lower face of the change lever 52 onto the intermediate tray 59 so that the lower side is the copied side. The paper in the intermediate tray 59 is fed again by the counterclockwise rotation of the paper-re-feed roller 61.

The paper to be fed again is handled by rollers 44, 45, 46 and is carried to the pair of timing rollers 48. Then, duplex copy or composite copy operation is carried out similarly to the normal copy mode.

(c) Operational panel

Figure 2:
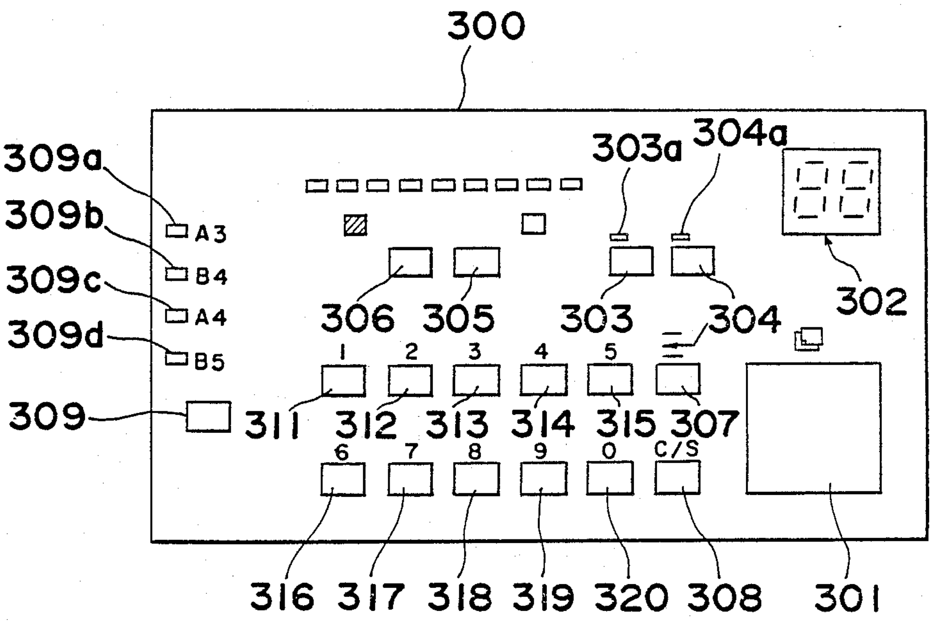
FIG. 2 is a plan view of an operation panel.

An operational panel 300 of the copy machine will be explained with reference to FIG. 2. Following keys and displays are arranged on the operational panel 300: a print key 301 for starting a copy action, a numeral display 302 of two figures, an interruption key 307 for designating the interruption copy, a clear/stop key 308, ten-keys 311 to 320 each for a numeral of "1", "2", . . . , "9", and "0", a selection key 309 for designating the size of a paper, up and down keys 305, 306 for specifying or changing the copy density stepwise, a selection key 303 for selecting the duplex copy mode, and a selection key 304 for selecting the composite copy mode. Display lamps 303*a* and 304*a* show that the selection keys 303 and 304 are pushed, respectively. The paper size is changed successively by each push of the selection key 309 being a rotation key, and display lamps 309*a*, 309*b*, 309*c* and 309*d* show that paper sizes of A3, B4, A4 and B5 are selected, respectively. (d) Control circuit of the copy machine FIGS. 3(*a*) and (*b*) show a part and the remaining one of a control circuit of the copy machine according to this invention, respectively. A one-chip microprocessor (CPU1) 201 controls both of second one-chip microprocessor (CPU2) 221 for controlling the optical system 1 and third one (CPU3) 2300 for controlling an editor 2000, which will be explained later, through an interruption terminal INT, a data input terminal SIN and a data output terminal SOUT. Reference numerals 202, 205 and 206 denote a switch matrix, a decoder and a driver, respectively. Output ports A1 to A12 are connected to drivers (not shown) of a main motor M1, a development motor M2, a clutch for actuating the pair of timing rollers 48, a clutch for actuating the paper-feed roller 33, a clutch for actuating the paper-feed roller 34, the charger 5, the transfer charger 14*a*, a clutch for actuating the paper-re-feed roller 61, a solenoid for actuating the change lever 24, a solenoid for actuating the change lever 52, a solenoid for moving the paper-re-feed roller 61 up and down and a solenoid for aligning a paper in the intermediate tray 59, respectively, The clutches and solenoids are not show explicitly in the FIG. 1. The microprocessor 201 is connected further to the mid-image eraser 1100, the LED array 1202 and the liquid crystal shutter 1210. A driver 206 drives stepping motors 211, 212, 213 (not shown in FIG. 1 ) for paper adjustment and a stepping motor 1203 for the LED writing head 1201.

The second microprocessor 221 is connected to a driver 223 of a DC motor M3 for the document scan of the optical system 1, a driver 224 of a stepping motor M4 (not shown) for varying magnification power, and the various position switches 70 to 73 of the scanning system.

(e) Data writing mechanism

Figure 4:
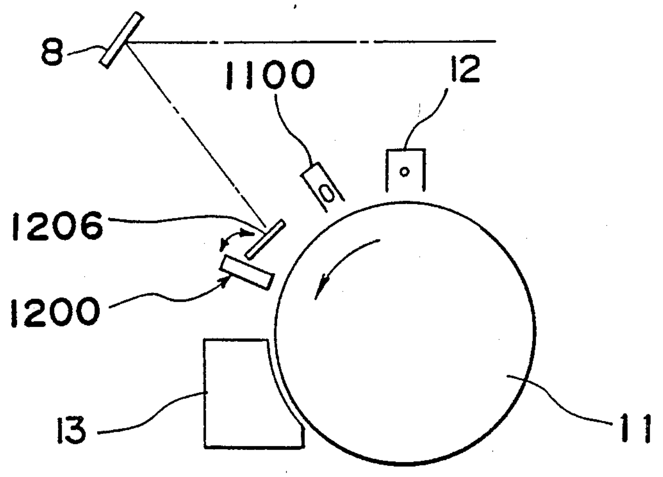
FIG. 4 is a schematic cross-sectional view of a data writing device.
Figure 5:
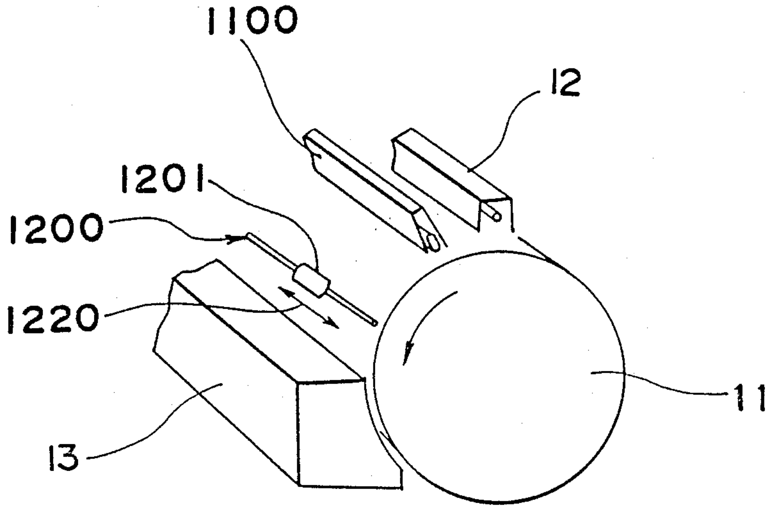
FIG. 5 is a schematic partial perspective view of the data writing device.

A data writing mechanism, as shown in FIGS. 4 and 5, consists essentially of a mid-image eraser 1100 for erasing an area between two latent images and side areas of the latent image according to the magnification power m designated, and an LED writing device 1200.

Figure 6:
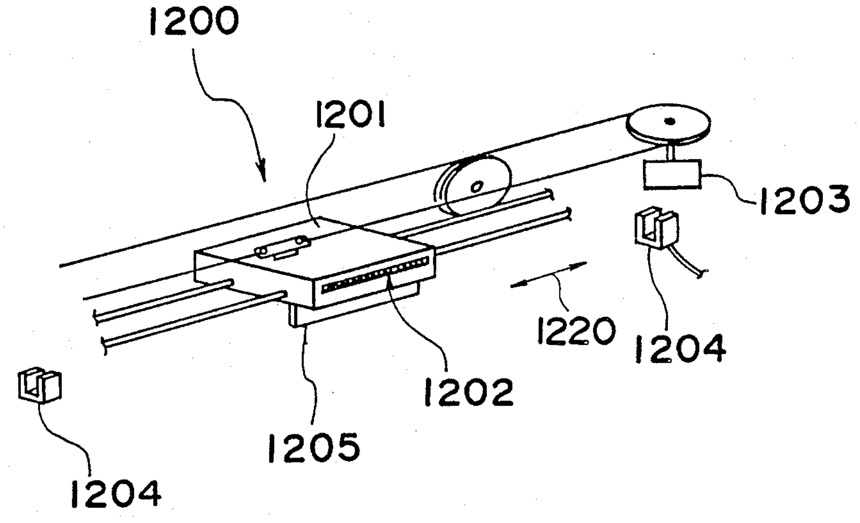
FIG. 6 is a perspective view of an LED writing head shown in FIG. 5.
Figure 7:
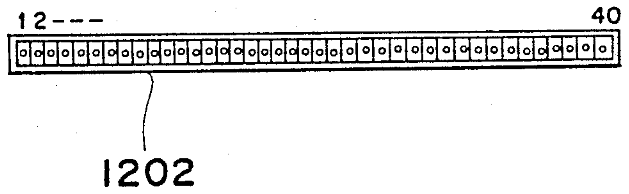
FIG. 7 is a front view of an LED array of the LED writing head.

FIG. 6 shows the LED writing device 1200 which provides an LED writing head 1201 with an LED array 1202 of forty LEDs aligned at the pitch of 1 mm as shown in FIG. 7 and with an interrupter 1205 fixed on the bottom of the housing of the head 1201. The writing head 1201 can be moved by a stepping motor 1203 to the left or right along a pair of guide rods parallel to the axis of the drum 11 as indicated by an arrow 1220. Sensors 1204 are arranged at both stroke ends of the writing head 1201, respectively, in order to detect the position of the writing head 1201 so that they can be turned on by the interrupter 1205.

The head 1201 is moved by the stepping motor 1203 in this embodiment. However, if an LED array 1202 which extends over the whole axial length of the drum 11 is available, such a motor is not needed.

Further, the LED writing device 1200 provides a shutter 1206 supported on the head 1201, as shown in FIG. 4, and the shutter 1206 is actuated so as to shade the light path of document image to the drum 11 when a solenoid (not shown) is energized.

Figure 8:
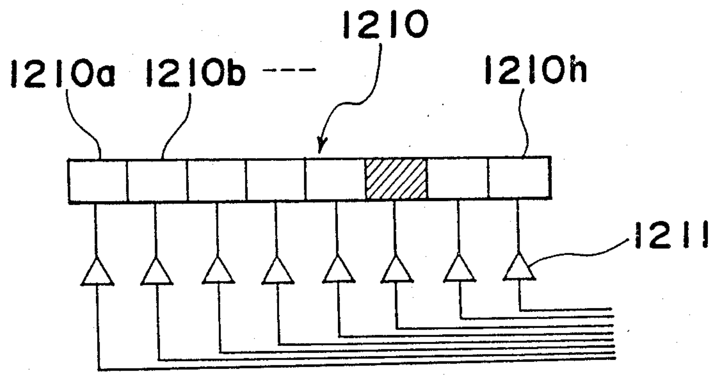
FIG. 8 is a schematic diagram of a liquid crystal shutter.

FIG. 8 shows another shutter 1210 made of liquid crystal. The liquid crystal shutter 1210 is divided into eight blocks from 1210*a* to 1210*h* each having a width of 40 mm which are arranged linearly in parallel to the axial direction of the drum 11. Each block can be driven independently by a driver 1211 according to a signal sent from the first CPU 201 (see FIG. 9). Thus, the light path can be shaded in the unit of 40 mm (for example, a hatched part in FIG. 8) along the lengthwise direction of the LED head 1201.

Figure 9:
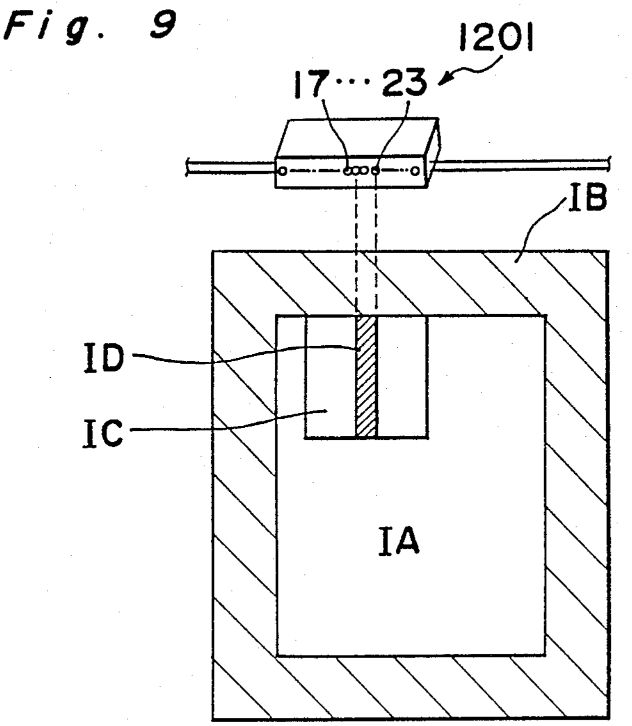
FIG. 9 is a diagram which shows a relation between the LED head and image on the photoconductor drum.

FIG. 9 shows a relation between the LED head 1201 and a latent image on the photoconductor drum 11. In FIG. 9, the LED head 1201 is moved by the stepping motor 1203 to a position determined based on input data from the editor 2000. The development elevation of the photoconductor drum 11 is shown schematically in FIG. 9; that is, IA denotes an area on which a latent image of document is formed. IB denotes an area outside the area IA to be erased by the mid-image eraser 1100 which also acts as a side eraser, IC denotes an area designated by the editor 2000 wherein a data is to be written, and ID denotes a longitudinal area when the longitudinal direction is designated as the direction for writing data. (The area ID may also be a horizontal area if desired.) In the situation shown in FIG. 9, the input data is written by seven LEDs from No. 17 to No. 23 of the array 1202, and the other LEDs Nos. 1 to 16 and 24 to 40 play a role of an eraser for erasing both side areas of the area ID in the area IC.

The timings for turning on and off respective LEDs of the LED array 1202 are controlled according to the revolution rate of the drum 11 so that the time unit may correspond to a pitch of 1 mm when seen in the rotation direction of the drum 11.

Figure 10:
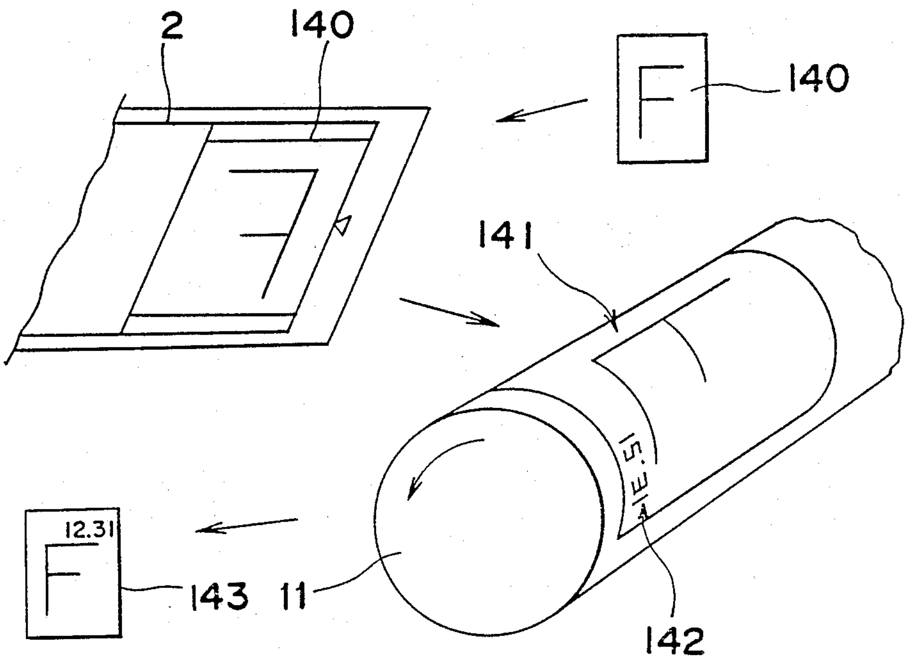
FIG. 10 is a diagram which shows steps of data entry on a document.

FIG. 10 schematically shows processes starting from a document 140 until a copy 143 of the document 140 is obtained. The document 140 on which a character "F" is written is placed on the platen glass 2 at first. When the copy process is started, latent images 141 and 142 of the document 140 and an entry data of a date, "12.31", are formed on the photoconductor drum 11, respectively, and they are transferred to a copy paper 143 as toner images according to the well known electrophotographic process. The latent image 142 of the written data is formed in the right-hand side above the latent image 141 of the document.

Figure 11:
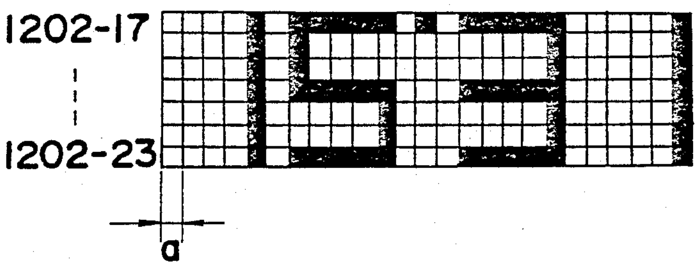
FIGS. 11 and 12 are diagrams of examples of data to be written, respectively.

FIG. 11 shows an example of a dot matrix for showing a driving method of the LED array 1202 in the case that the date of "12.31" (Dec. 31) as an entry data is to be written along a vertical area as indicated by ID in FIG. 9. Each of seven light-emitting diodes (LEDs) of, for example, Nos. 17 to 23 of the LED array 1202 is turned on or off in the predetermined order as shown in the dot matrix according to the rotation of the photoconductor drum 11. In other words, the seven LEDs of Nos. 17 to 23 are all lighted first. Next, the photoconductor drum 11 is rotated by an angle corresponding to four dots 4 * *a*, and the LEDs Nos. 17 to 23 are all turned off in order to write "1". Then, the photoconductor drum 11 is rotated further by an angle corresponding to one dot a, and the LEDs are all lighted again. Next, the photoconductor drum 11 is rotated further by an angle of one dot a, and only LEDs of Nos. 21 and 22 are kept lighted and other LEDs are turned off. When the photoconductor drum 11 is rotated further by an angle of one dot a, further only LEDs of Nos. 18, 19, 21 and 22 are lighted. After the photoconductor drum 1 is rotated further by an angle of three dots 3*a*, LEDs of Nos. 21 and 22 are turned off while keeping LEDs Nos. 18 and 19 lighted. Thus, "2" is written on the drum 11. Subsequently, ".", "3" and "1" are written similarly.

Figure 12:
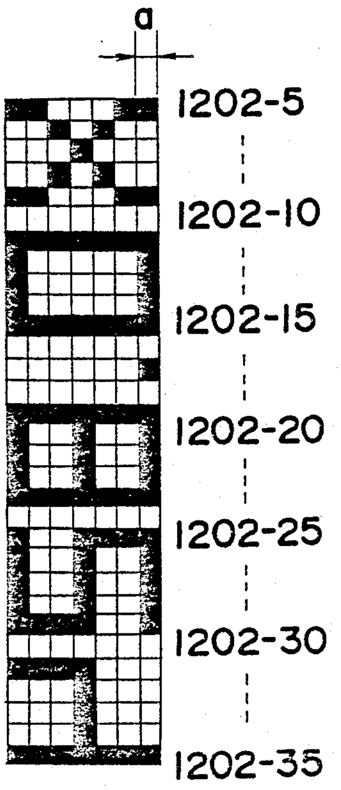

FIG. 12 shows an example of a dot matrix for driving the LED array 1202 in the case that a magnification data of "x 0.824" is to be written along a horizontal line. This data can be written similarly with thirty one LEDs of NOs. 5 to 35 of the LED array 1202.

A following table shows an example of digital data for driving the LED array 1202 sent to the first CPU 201 from the third CPU 2300 which controls the editor 2000 in the case shown in FIG. 12. The data "1" indicates the lighting of LED and, when lighted, the corresponding latent image is erased and, therefore, it is not developed. The data "0" indicates the putting out of LED. In this case, the corresponding latent image remains and, therefore, it is developed.

If the inversion from the positive to the negative is designated, the driving data of the LEDs effective for forming the image of entry data (LEDs Nos. 5 to 35 in the above-mentioned example) are reversed from "0" to "1" or vice versa. LEDs except them (LED No. 1 to 4 and 36 to 40) are lighted constantly for erasing.

TABLE

| | LED No. of LED array | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| timing 1 | 1 | 1 | 1 | 1 | 0 | 1 | 1 | 1 | 0 | 1 | 0 | 0 | 0 | 0 | 0 | 1 | 0 | 1 | 0 |
| timing 2 | 1 | 1 | 1 | 1 | 0 | 1 | 1 | 1 | 0 | 1 | 0 | 1 | 1 | 1 | 0 | 1 | 1 | 1 | 0 |
| timing 3 | 1 | 1 | 1 | 1 | 1 | 0 | 1 | 0 | 1 | 1 | 0 | 1 | 1 | 1 | 0 | 1 | 1 | 1 | 0 |
| timing 4 | 1 | 1 | 1 | 1 | 1 | 1 | 0 | 1 | 1 | 1 | 0 | 1 | 1 | 1 | 0 | 1 | 1 | 1 | 0 |
| timing 5 | 1 | 1 | 1 | 1 | 1 | 0 | 1 | 0 | 1 | 1 | 0 | 1 | 1 | 1 | 0 | 1 | 1 | 1 | 0 |
| timing 6 | 1 | 1 | 1 | 1 | 0 | 1 | 1 | 1 | 0 | 1 | 0 | 1 | 1 | 1 | 0 | 1 | 1 | 1 | 0 |
| timing 7 | 1 | 1 | 1 | 1 | 0 | 1 | 1 | 1 | 0 | 1 | 0 | 0 | 0 | 0 | 0 | 1 | 1 | 1 | 0 |

| | LED No. of LED array | | | | | | | | | | | | | | | | | | | | |
|---|---|---|---|---|---|---|---|---|---|---|---|---|---|---|---|---|---|---|---|---|---|
| | 20 | 21 | 22 | 23 | 24 | 25 | 26 | 27 | 28 | 29 | 30 | 31 | 32 | 33 | 34 | 35 | 36 | 37 | 38 | 39 | 40 |
| timing 1 | 0 | 0 | 0 | 0 | 1 | 0 | 0 | 0 | 0 | 0 | 1 | 1 | 1 | 1 | 1 | 0 | 1 | 1 | 1 | 1 | 1 |
| timing 2 | 1 | 1 | 1 | 0 | 1 | 0 | 1 | 1 | 1 | 1 | 1 | 1 | 1 | 1 | 1 | 0 | 1 | 1 | 1 | 1 | 1 |
| timing 3 | 1 | 1 | 1 | 0 | 1 | 0 | 1 | 1 | 1 | 1 | 1 | 1 | 1 | 1 | 1 | 0 | 1 | 1 | 1 | 1 | 1 |
| timing 4 | 0 | 0 | 0 | 0 | 1 | 0 | 0 | 0 | 0 | 0 | 1 | 0 | 0 | 0 | 0 | 0 | 1 | 1 | 1 | 1 | 1 |

TABLE-continued

| | | | | | | | | | | | | | | | | | | | | |
|---|---|---|---|---|---|---|---|---|---|---|---|---|---|---|---|---|---|---|---|---|
| timing 5 | 1 | 1 | 1 | 0 | 1 | 1 | 1 | 1 | 1 | 0 | 1 | 0 | 1 | 1 | 1 | 0 | 1 | 1 | 1 | 1 |
| timing 6 | 1 | 1 | 1 | 0 | 1 | 1 | 1 | 1 | 1 | 0 | 1 | 0 | 1 | 1 | 1 | 0 | 1 | 1 | 1 | 1 |
| timing 7 | 0 | 0 | 0 | 0 | 1 | 0 | 0 | 0 | 0 | 0 | 1 | 0 | 1 | 1 | 1 | 0 | 1 | 1 | 1 | 1 |

(f) Editor

Figure 13:
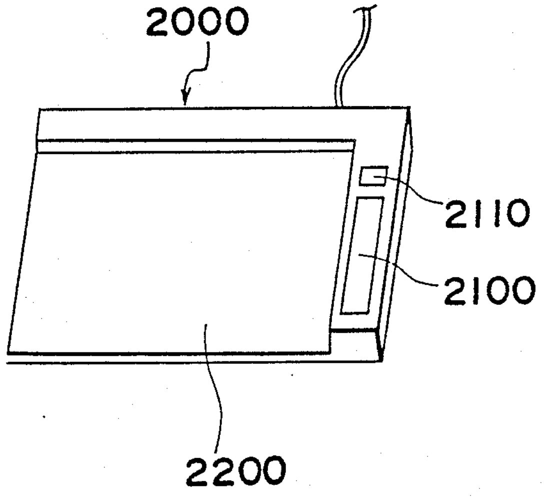
FIG. 13 is a schematic perspective view of an editor.

FIG. 13 shows an editor 2000 for designating an area for editing and for entering data. The editor 2000 has an area 2200 provided for designating an editorial area and an area for writing data, and for entering data to be written, an operation panel 2100 and a liquid crystal display 2110 for displaying data entered. In this embodiment, the editor 2000 has a function to specify a data entry area. This gives the editor 2000 an additional merit.

Figure 14:
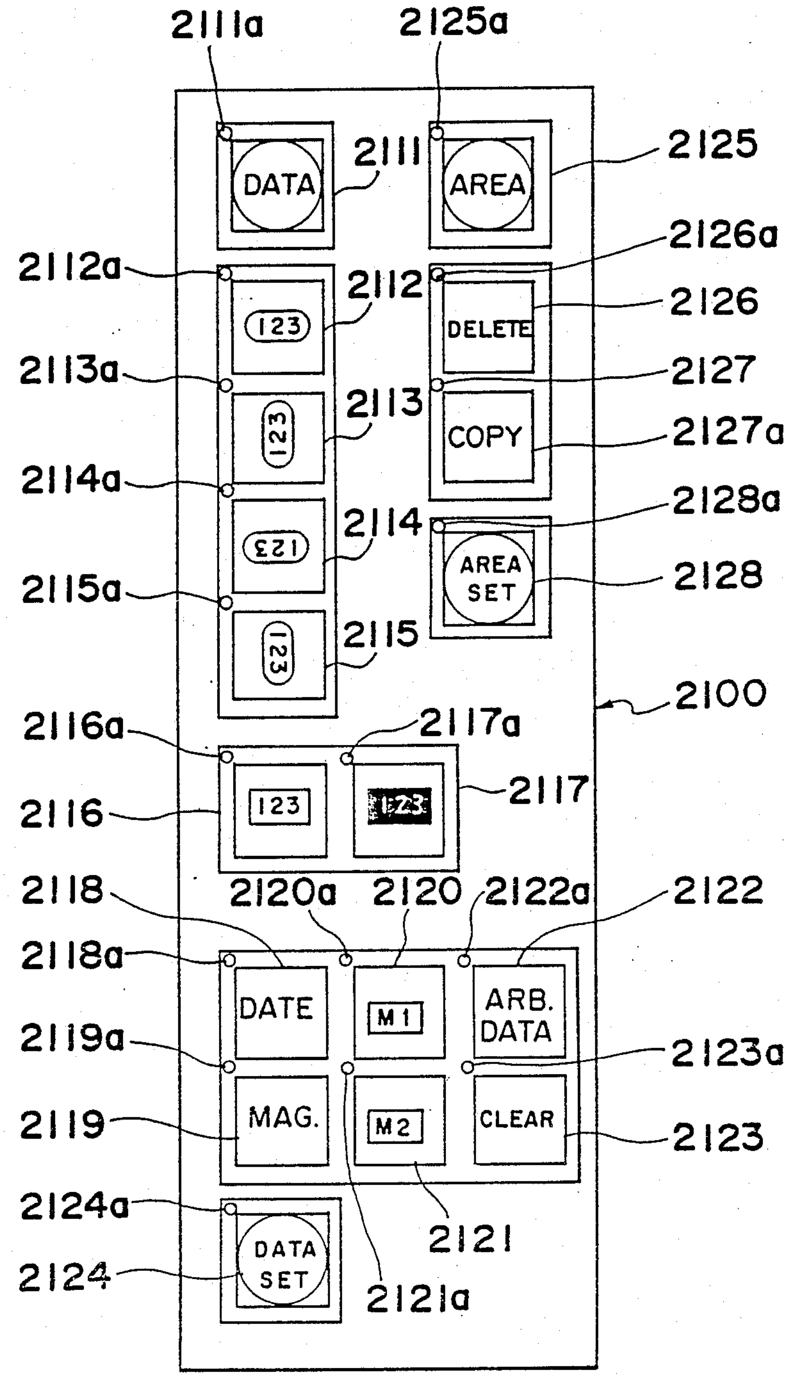
FIG. 14 is a plan view of an operation panel of the editor.

FIG. 14 shows the arrangement of keys 2111 to 2128 and LEDs 2111*a* to 2128*a*, corresponding to individual keys 2111 to 2128 on the operational panel 2100, respectively. The key 2111 is provided for starting to input a position for writing data. Keys 2112 to 2115 are provided for designating a direction for writing data, and keys 2116 and 2117 are provided for designating negative and positive copy modes upon writing data, respectively. A key 2118 is provided for designating the date as the data to be written. A key 2119 is provided for designating a magnification power at that time as the data to be written. Keys 2120 and 2121 are provided for storing an arbitrary data to be entered by a user, a key 2122 is provided for starting the entry of an arbitrary data to be stored, a key 2123 is provided for clearing a wrong data, a key 2124 is provided for setting all designations regarding the entry of data, a key 2125 is provided for starting the designation of an area for the edition of image, keys 2126 and 2127 are provided for designating deletion or copy of an image on the designated area, respectively, and a key 2128 is provided for setting the designated area for the edition of image.

Figure 15:
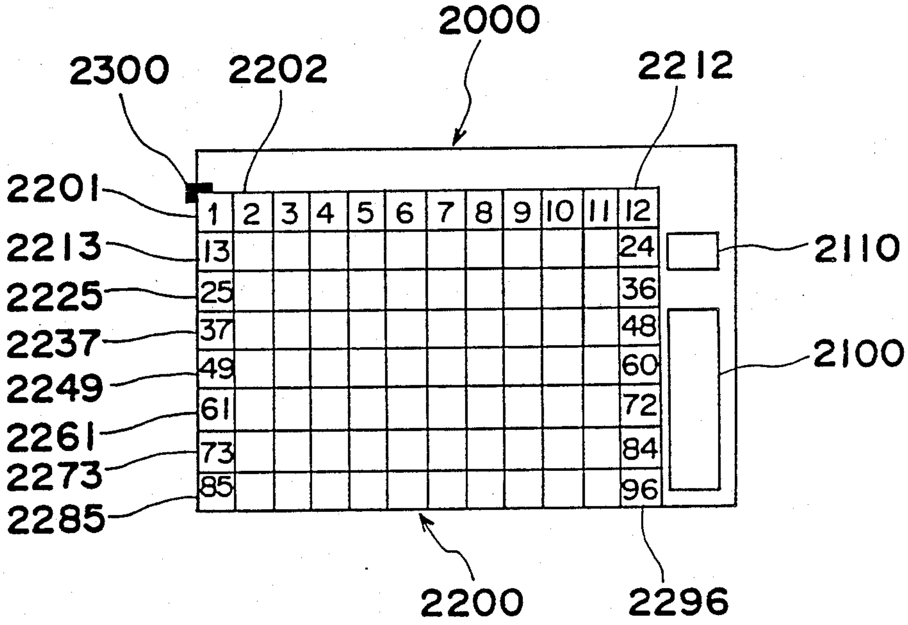
FIG. 15 is a plan view of the editor showing a switch matrix formed on an edition area.

FIG. 15 shows the editor 2000 having the editorial and data writing area 2200 which provides many keys 2201 through 2296 arranged in a matrix for designating an area.

The numerals of the keys 2201 to 2296 represent respective orders of small squares defined on the area 2200. A number of reference numerals are omitted in FIG. 15 for simplicity. In this case, the area 2200 consists of a matrix of 12×8 of keys 2201 to 2296, and each key corresponds to each square of 40mm×40mm. Each square can be specified as a minimum unit on the edition of image. An input data is written within one square. A corner indicator 2300 for setting a document can be moved according to the size of the document. This makes the correspondence between the position of the document having been set and position of keys understandable easily.

If a document is placed on the area 2200 of the editor 2000, a position of a data to be written can be designated easily because the result can be understood readily.

Figure 16:
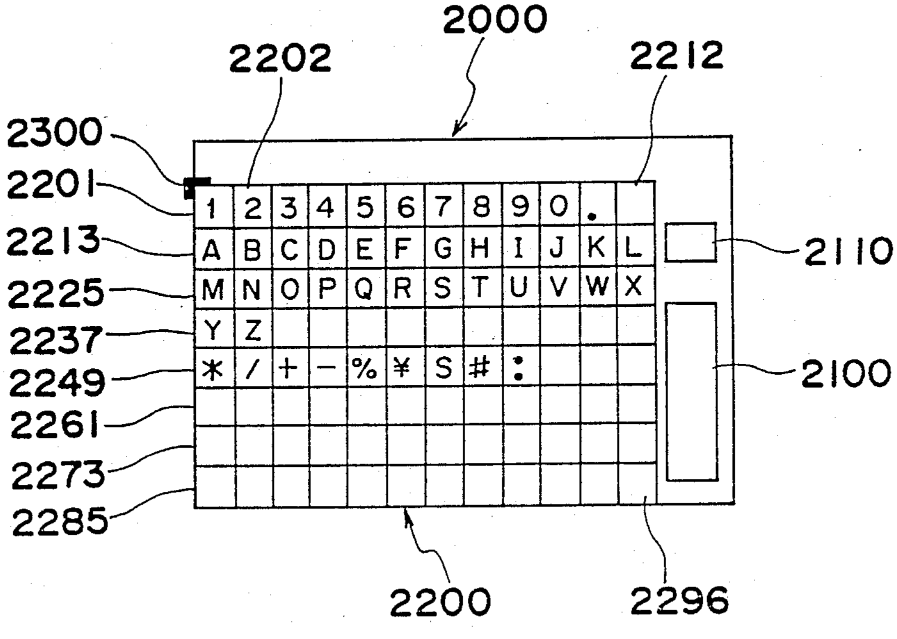
FIG. 16 is a plan view of the editor showing a matrix switch showing alpha-numeric characters and symbols using the switch matrix.

FIG. 16 shows the area 2200 when it is used for the entry of desired data. In this case, the above-mentioned keys 2201 to 2296 become input keys of the alphabet, numerals and signs, which may be indicated lightly on the surfaces of individual keys, or may be printed on a transparent plastic film being formed so as to cover the area 2200. The area 2200 may be a graphic liquid crystal display on which transparent touch sensors are adhered for indicating positions, so that the contents of the display can be switched from the content of FIG. 15 to that of FIG. 16 or vice versa. Two kinds of displays may be printed on a sheet in each area so that a back light of LEDs or the like illuminates only the selected display. Further, the area 2200 may consist of a rotatable display so that the mode of a display of each area is switched alternatively.

Figure 17:
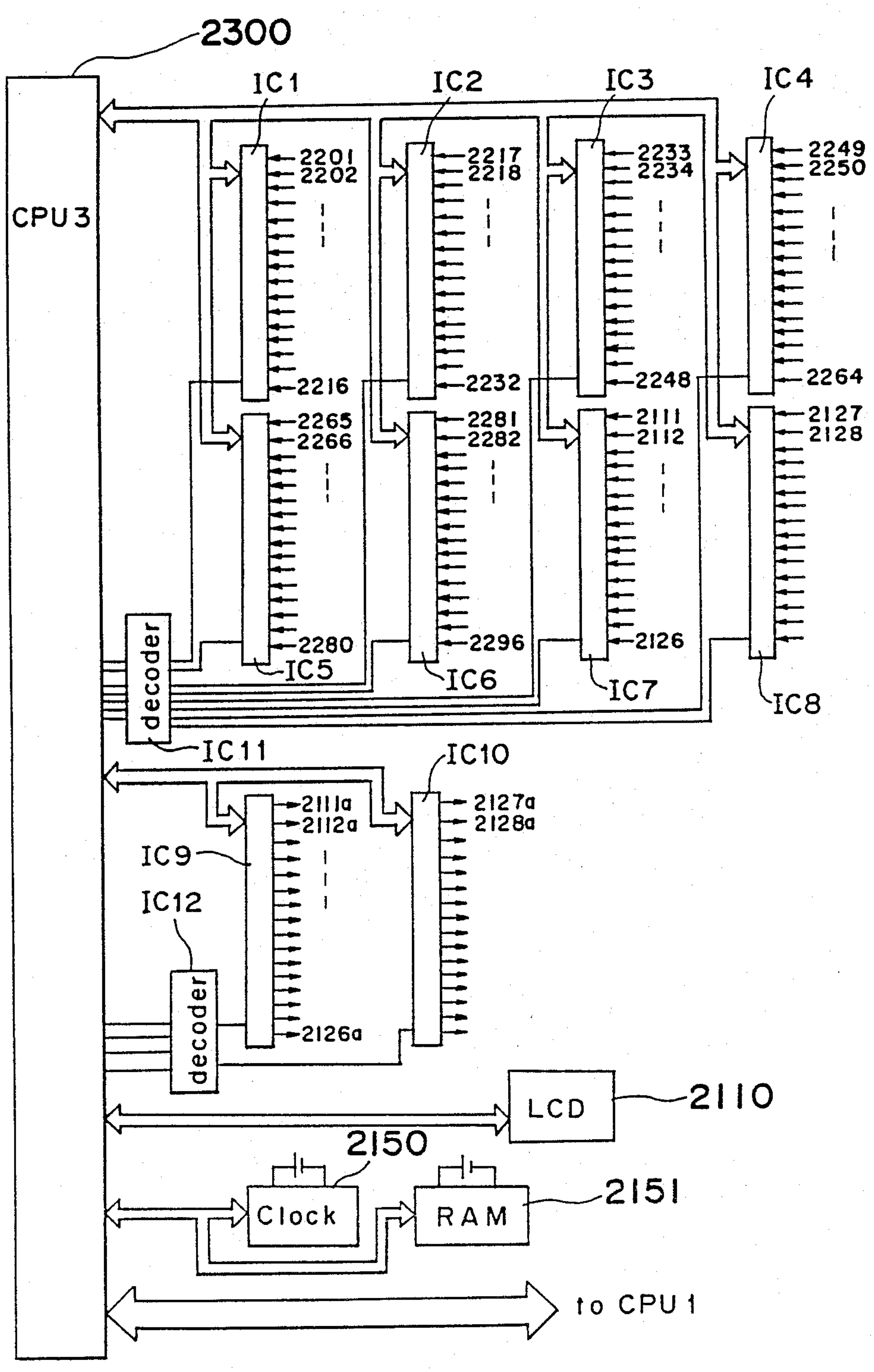
FIG. 17 is an electrical circuit diagram of the third CPU which controls the editor.

FIG. 17 shows a circuit for controlling the editor 2000. The third CPU 2300 is connected to input-output circuit devices IF1 to IF10 such as "8243"s offered by INTEL, which are connected to keys 2201 to 2296 and 2111 to 2128 and the displays 2111*a* to 2128*a*. Decoders IC11 and IC12 are used for the selection of the devices IC1 to IC10. The third CPU 2300 is also connected to the liquid crystal display (LCD) panel 2110 and an integrated clock circuit 2150 and a RAM 2151. The latter two are backed up individually by a back-up battery. The third CPU 2300 communicates data with the first CPU 201 through communication lines.

(g) Relation between duplex copy mode and data writing mode

Figure 18:
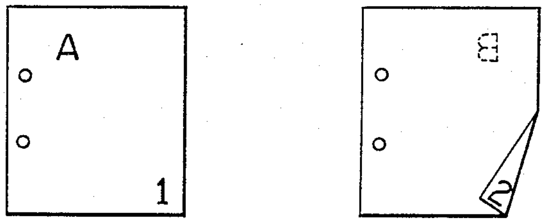
FIG. 18 is a diagram of an example of data entry in the duplex copy.

FIG. 18 shows an example of duplex copy wherein a page number is entered both in the front side (first page) and in the back side (second page). The page numbers "1" and "2" are entered at the right bottom corner, respectively. A back side copy is shown by dashed lines which is folded back partially in order to show the position of the page number.

Figure 19:
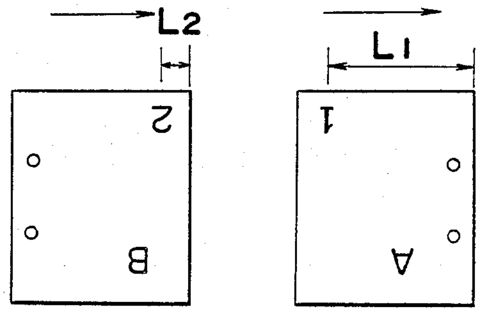
FIG. 19 is a diagram showing a manner of data entry in the duplex copy.

FIG. 19 shows relations of individual images to be formed on respective pages together with the copy direction in the duplex copy mode. It is apparent from FIG. 19 that the entry positions of the page data should be differed between the front side and the back side of the duplex copy. Therefore, if a data is entered at a distance L1 from the left edge of the first page, the corresponding data is entered automatically at a distance L2 from the left edge of the second page which is equal to W-L1 wherein W is the width of the paper according to the present preferred embodiment. This automatic transformation is processed by a routine shown in FIG. 40.

(h) Composite copy mode and data editing mode

Figure 20:
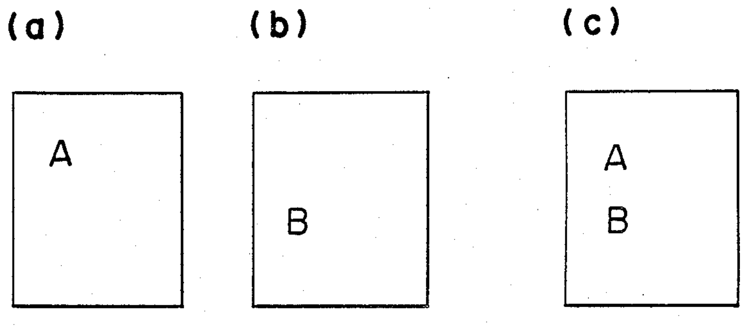
FIG. 20 is a diagram showing a manner of composite copy.

A composite copy is obtained by copying images two times on the same paper. FIG. 20(*c*) shows an example of a composite copy, wherein an image of a document containing a character "A" is copied at first as is shown in FIG. 20(*a*) and another image containing "B" as is shown in FIG. 2(*b*) is copied next.

Figure 21:
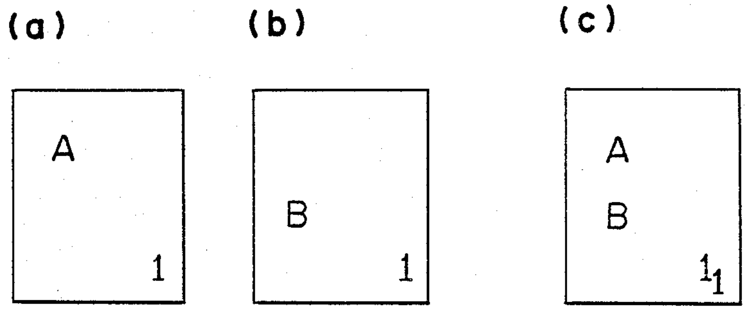
Fig. 21 PRIOR ART
FIG. 21 is a diagram showing a manner of composite copy according to the prior art.

If the same data is entered at the same position upon the first and second copies of a composite copy, the position of the data written upon the second copy is liable to shift from that of the first copy owing to, for example, a slight shift between drive timings of rollers 48 or supply timings of a blank paper as is shown in FIG. 21.

Figure 22:
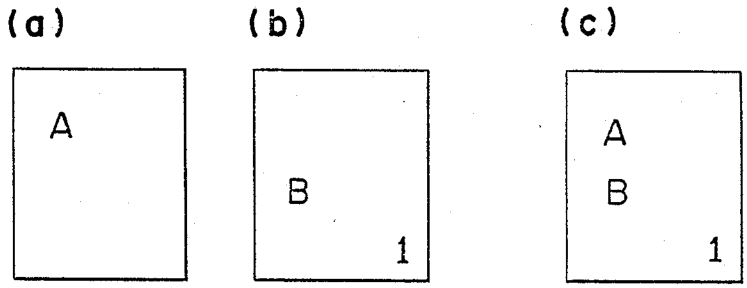
FIG. 22 is a diagram showing a manner of data entry in the composite, copy mode according to the present invention.

In the composite copy mode according to the present preferred embodiment, a data to be written is written only one time during one composite copy. In an example shown in FIGS. 22(*a*)-(*c*), a document containing "A" shown in FIG. 22(*a*) and another document containing "B" shown FIG. 22(*b*) with a page data of "1" are composited in the copy obtained, as is shown in FIG. 22(*c*). The page data "1" is written upon the second copy action. The data entry upon the first copy action is inhibited by a routine shown in FIG. 42 which will be explained later.

(i) Flow of the control of copy machine

Figure 23:
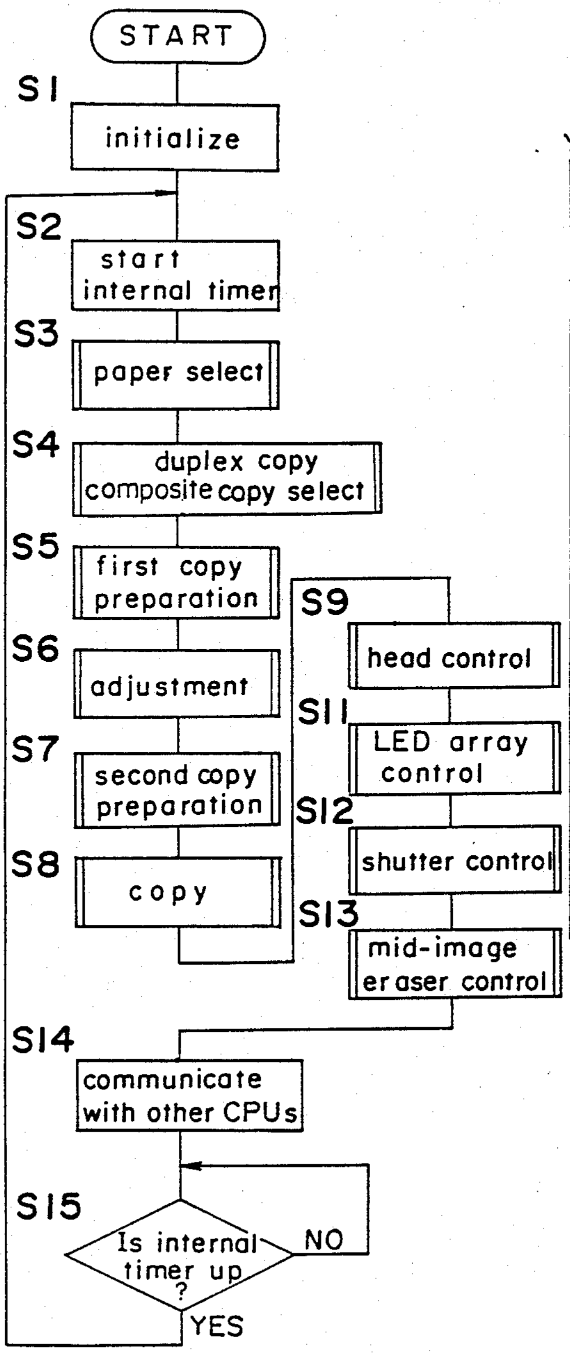
FIG. 23 is a flowchart of the main flow of the copy machine.

FIG. 23 shows a main flow of the first CPU 200 for controlling the copy machine. The program starts when the first CPU 200 is reset. The first CPU 200 is initialized by setting various registers and the copy machine is set in the initial mode (step S1).

Then, an internal timer whose value has been set upon the initialization is started (step S2).

Next, following subroutines of steps S3 to S13 shown in the flowchart are called successively: Paper select routine (step S3) is a routine for selecting a desirable paper size. Duplex copy and composite copy select routine (step S4) is a routine for deciding whether the duplex copy mode or the composite copy mode is selected. First copy preparation routine (step S5) is a routine for preparing the execution of the duplex copy mode or the composite copy mode. Adjustment routine (step S7) is a routine for adjusting the position of a paper 81 sent to the intermediate tray 58. Second copy preparation routine (step S7) is a routine for preparing the paper-re-feed. Copy action routine (step S8) is a routine for performing a copy. Head control routine (step S9) is a routine for controlling the position of the LED head 1201. LED array control routine (step S11) is a routine for controlling the LED array 1202. Shutter control routine (step S12) is a routine for controlling the liquid crystal shutter 1210 and mid-image eraser control routine (step S13) is a routine for controlling the mid-image eraser 1100.

After processing the all subroutines, the first CPU 201 communicates with other CPUs (step S14).

One main routine is completed when the internal timer having been started at step S2 is finished (step S15). The interval of this routine is used for counting various timers used in the respective subroutines. In other words, the individual timers of the various subroutines are decided by counting a time unit of the time interval between S2 and S15.

Figure 24:
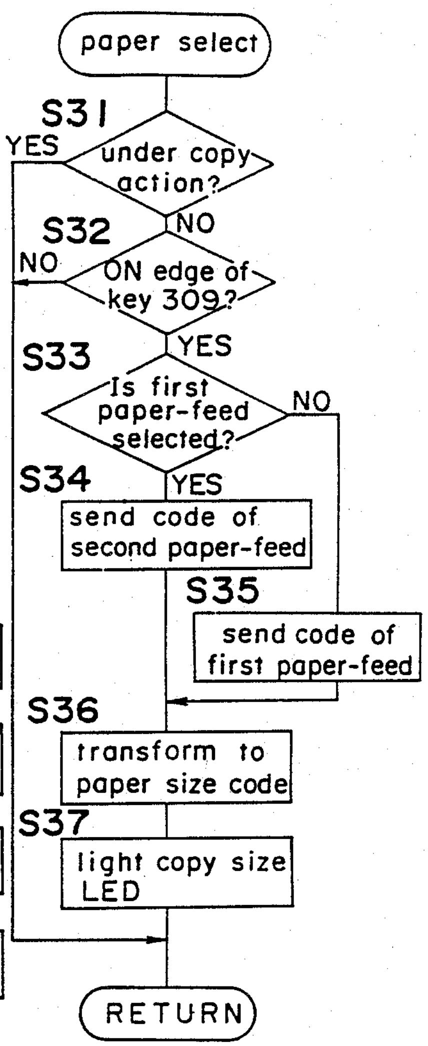
FIG. 24 is a flowchart of paper select routine.

FIG. 24 shows the paper select routine (step S3). First, it is decided if the copy machine is under copy action (step S31). If the decision is YES, this routine is passed. If the copy machine is not under copy action, it is decided next if the paper size select key 309 is pushed or an ON edge of a signal from the key 309 is detected (step S32). If the decision is "YES", it is decided next if the first paper-feeding means (the stock 31) has been selected or not (step S33). An ON edge of a signal means a transition of "0" level to "1" level. If the first paper-feeding means has been selected, the second paper-feeding means (the stock 32) is selected and the paper size code of papers contained in the second paper-feeding means is sent to the first CPU 201 (step S34); otherwise the first paper-feeding means is selected and the paper size code of papers contained in the first paper-feeding means is sent to the first CPU 201 (step S35).

The paper size codes have been determined beforehand. For example, codes "1", "2", "3" and "4" correspond to paper sizes B5, A4, B4 and A3 in a lengthwise position, respectively. Then, the length and width of each paper which corresponds to the paper size code received are memorized (step S36). For example, if the copy size code is "1", the length and the width are memorized as 257 mm and as 182 mm, respectively.

Then, one of the LEDs 309*a* to 309*d* which corresponds to the size of papers set in the stock 31 or 32 is lighted (step S37).

Figure 25:
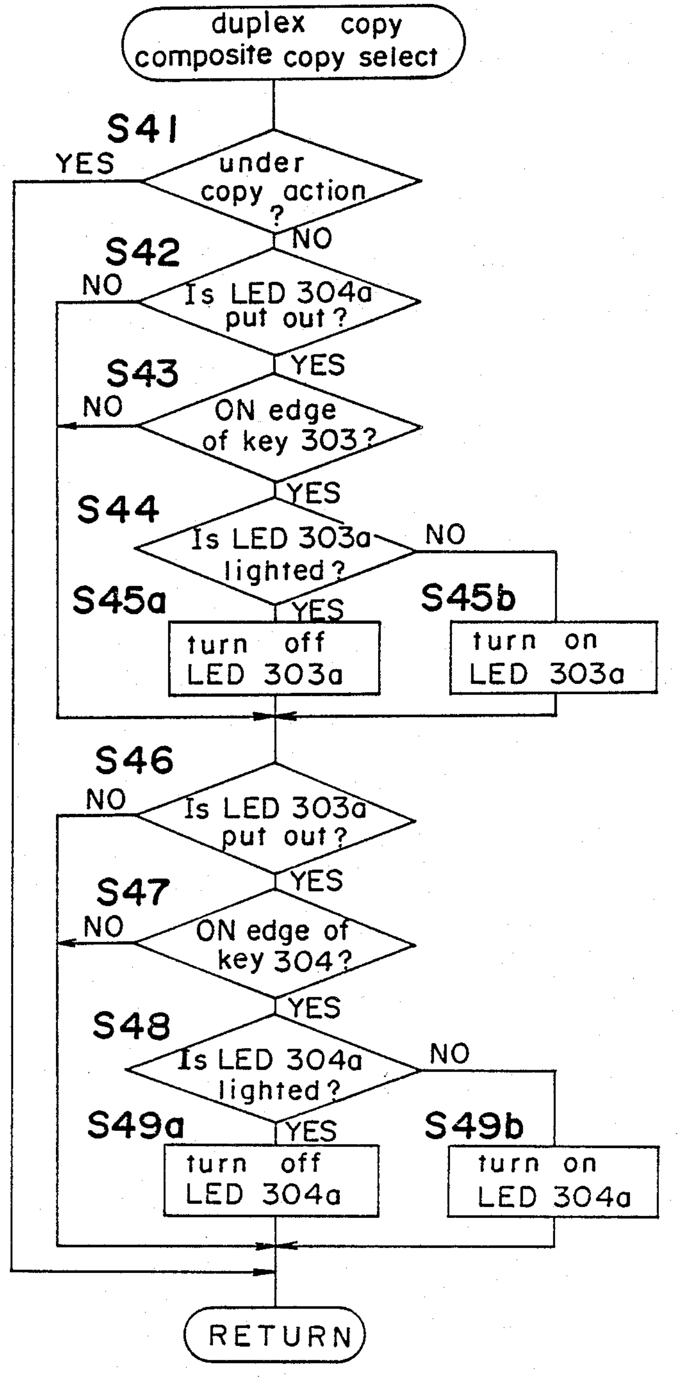
FIG. 25 is a flowchart of duplex copy and composite copy select routine.

FIG. 25 shows a flow of duplex and composite copy select routine (step S4). First, it is decided if the copy machine is under copy action (step S41). If the decision is "yes", this routine is skipped. If the copy machine is not under copy action, it is decided next if the LED 304*a* has been turned off namely the composite copy mode has not been selected (step S42), and then it is decided if an ON edge ("0"→"1") of a signal from the key 303 for selecting duplex copy mode is detected (step S43). If the decision is "NO", the program proceeds to step S46. If the decision is "YES", the LED 303*a* is put out or lighted according to a state in that it has been lighted or not (steps S44, S45*a*, S45*b*).

Next, it is decided if the LED 303*a* has been turned off or the duplex copy mode has not been selected (step S46) and then, it is checked if an ON edge of a signal from the key 304 for selecting composite copy mode is detected (step S47). If the decision is "NO", the program returns to the main routine. If the decision is "YES", the LED 304*a* is turned off or lighted according to a state in that it has been lighted or not (steps S48, S49*a*, S49*b*).

Thus, if an ON edge of either of selection keys 303, 304 is detected, either of LEDs 303*a*, 304*a* is turned on or turned off. However, the lighting state is kept seemingly.

Figure 26:
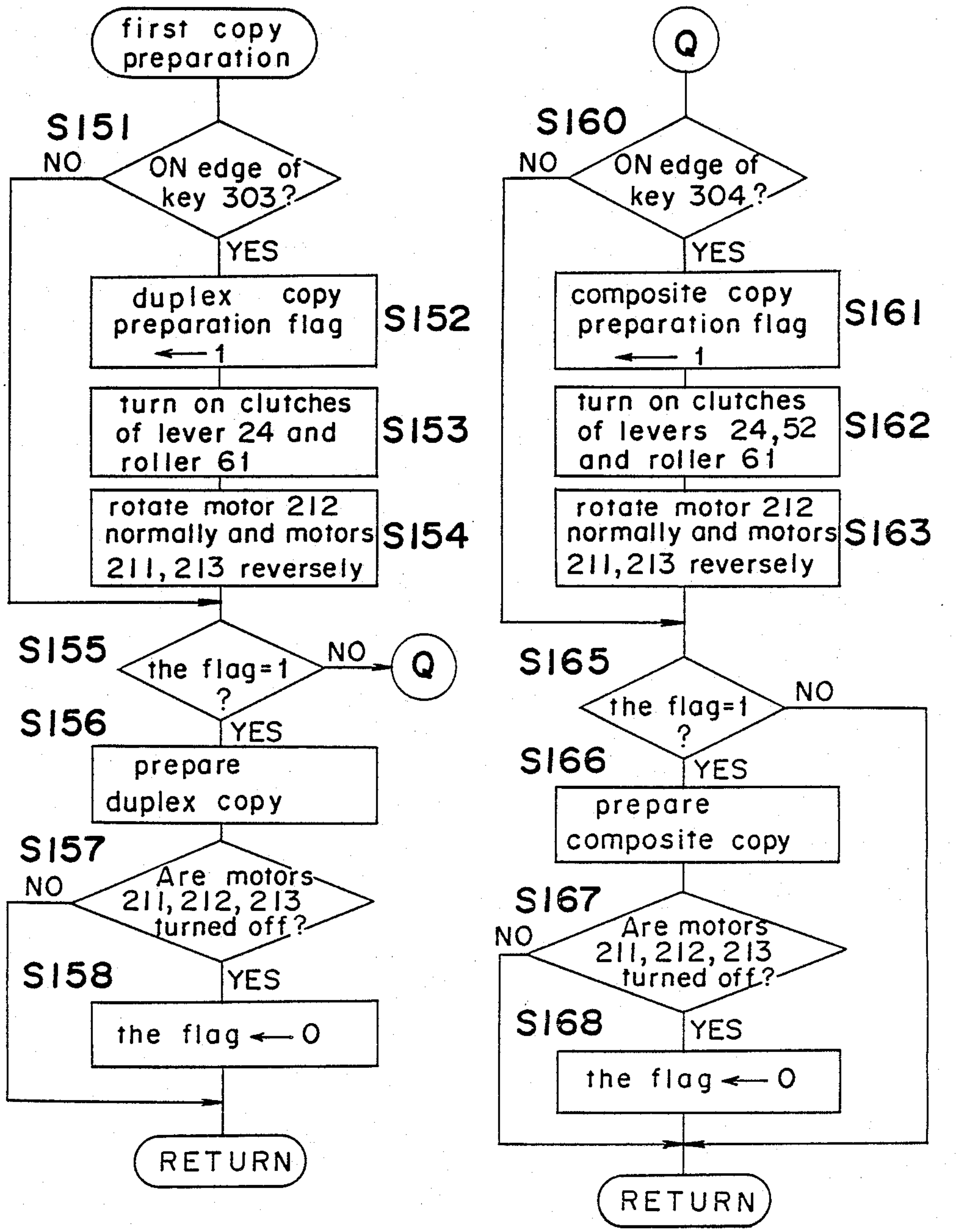
FIG. 26 is a flowchart of first copy preparation routine.

FIG. 26 shows the first copy preparation routine (step S5) wherein steps S151 to S158 and S160 to S168 are routines for the preparation of duplex copy and of composite copy, respectively. First, if an ON edge of a signal of the duplex copy select key 303 is detected (step S151), duplex copy preparation flag is set at "1" (step S152), clutches for the lever 24 and paper-re-feed roller 61 are actuated (step S153) so as to set the carriage path of a paper to the intermediate tray 59 and to set the paper-re-feed roller 61 at the top position. The solenoid of the lever 52 is not actuated, so that the lever 52 changes the carriage path to the carriage block. At the same time, stepping motors 211, 212 and 213 are actuated so as to move restriction plates for adjustment (not shown) to the prescribed position (step S154).

Next, if the duplex copy preparation flag is found to be set at "1" (step S205), the restriction plates are moved into the intermediate tray 59 according to the size of a paper in order to prepare receiving a paper copied on one side (step S156).

Then, if the stepping motors 211, 212 and 213 are all decided to be turned off (step S157), the duplex copy preparation flag is reset to be "0" (step S158), and the program returns to the main routine.

On the-other hand, if an ON edge of a signal of the composite copy selection key 304 is detected (step S160) in the state that duplex copy has not been selected and the decision at step S206 is "NO", composite copy preparation flag is set as "1" (step S161), and clutches of change levers 24, 52 and paper-re-feed roller 61 are turned on (step S162) so as to change the carriage path to carry a copied paper directly to the intermediate tray 59 and to place the paper-re-feed roller 61 at the top position. At the same time, stepping motors 211, 212 and 213 are actuated in order to move the restriction plates for adjustment (not shown) as in step S154 (step S163).

Next, if it is decided that the composite copy preparation flag has been set at "1" (step S165), the restriction plates for adjustment are moved into the intermediate tray 59 according to the size of a paper in order to prepare receiving a paper copied on one side (step S166).

Then, if the stepping motors 211, 212 and 213 are all decided to be turned off (step S167), the composite copy preparation flag is reset to be "0" (step S168), and the program returns to the main routine.

In the adjustment routine (step S6) not explained in detail here, each paper is adjusted preliminarily when sent to the intermediate tray 59 in the copy action.

Figure 27:
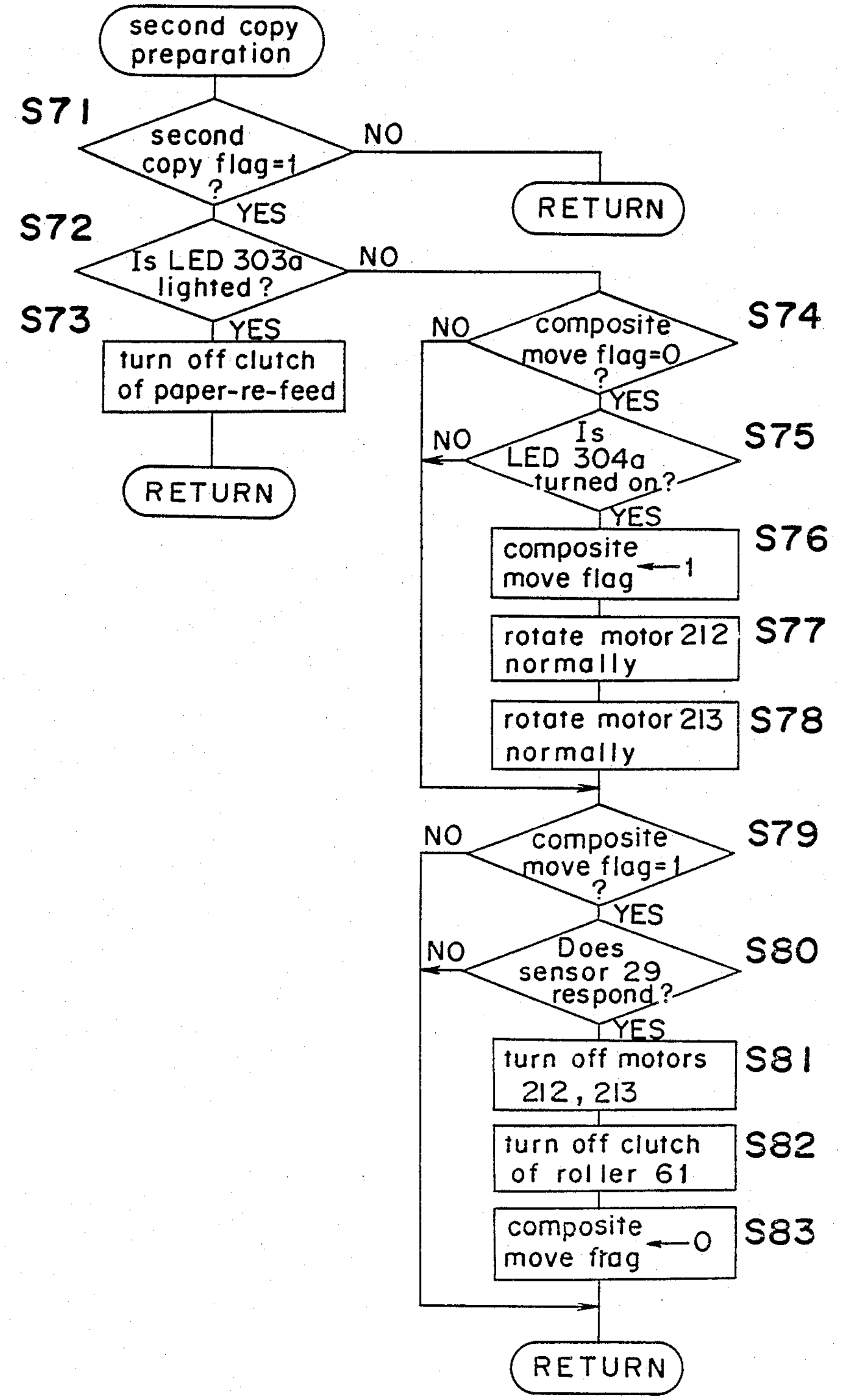
FIG. 27 is a flowchart of second copy preparation routine.

FIG. 27 shows the second copy preparation routine (step S8) for preparing the paper-re-feed. It is decided first if a second-copy flag is "1" (step S71). This flag is set at "1" when a copy on one side of a paper completes (refer to step S134). If the decision at step S71 is "YES", it is decided next if the LED 303*a* for displaying duplex copy selection is lighted (step S72). If the decision is "YES", namely duplex copy mode is selected, a clutch for the paper-re-feed roller 61 is turned off for the roller 61 to press a paper 63 which has been adjusted on the intermediate tray 59 (step S73).

On the other hand, if composite copy is selected ("NO" at step S72), it is decided next if composite move flag is "0" (step S74) and if the LED 304*a* for displaying composite copy selection is lighted (step S75). This flag is used to instruct moving a paper 63 to the paper-re-feed position in the composite copy mode when it is set at "0". If the decision is "YES" at both steps S74 and S75, the composite move flag is set at "1" (step S76), and stepping motors 212 and 213 are driven to rotate in the normal direction so as to move the paper in the direction of paper-re-feed (steps S77, S78).

Next, it is decided if the composite move flag is set at "1" (step S79) and if the sensor 29 detects that the paper is moved to the paper-re-feed position (step S80). If the decisions are all "YES", the stepping motors 212 and 213 are turned off (step S81). Then, the clutch of paper-re-feed roller 61, is turned off (step S82) in order to press the paper 63 moved to the paper-re-feed position by the roller 61 composite move flag is reset as "0" (step S83), and the program returns to main program.

Figure 28A:
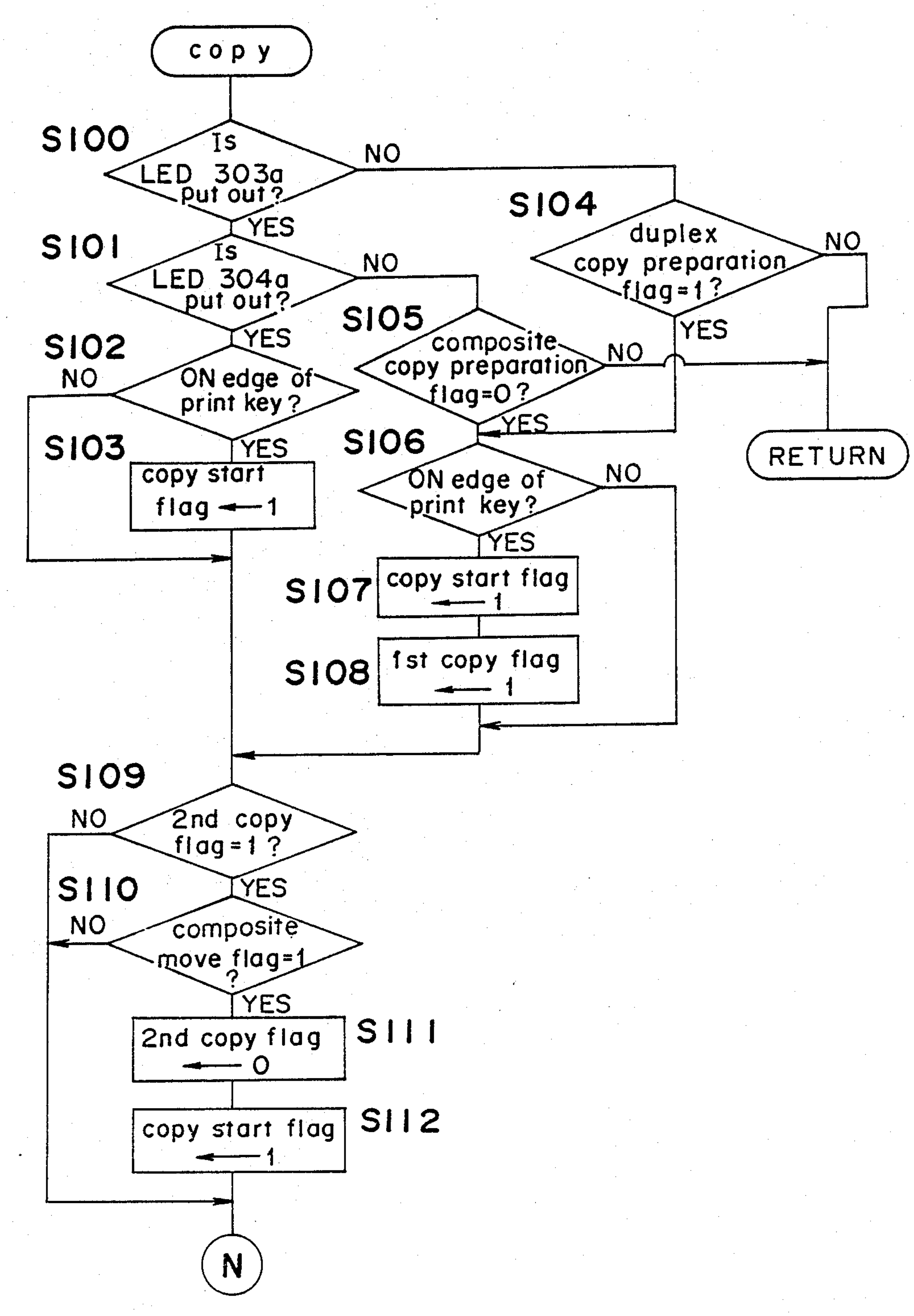
FIGS. 28 (*a*), (*b*) and (*c*) are flowcharts of copy routine.
Figure 28B:
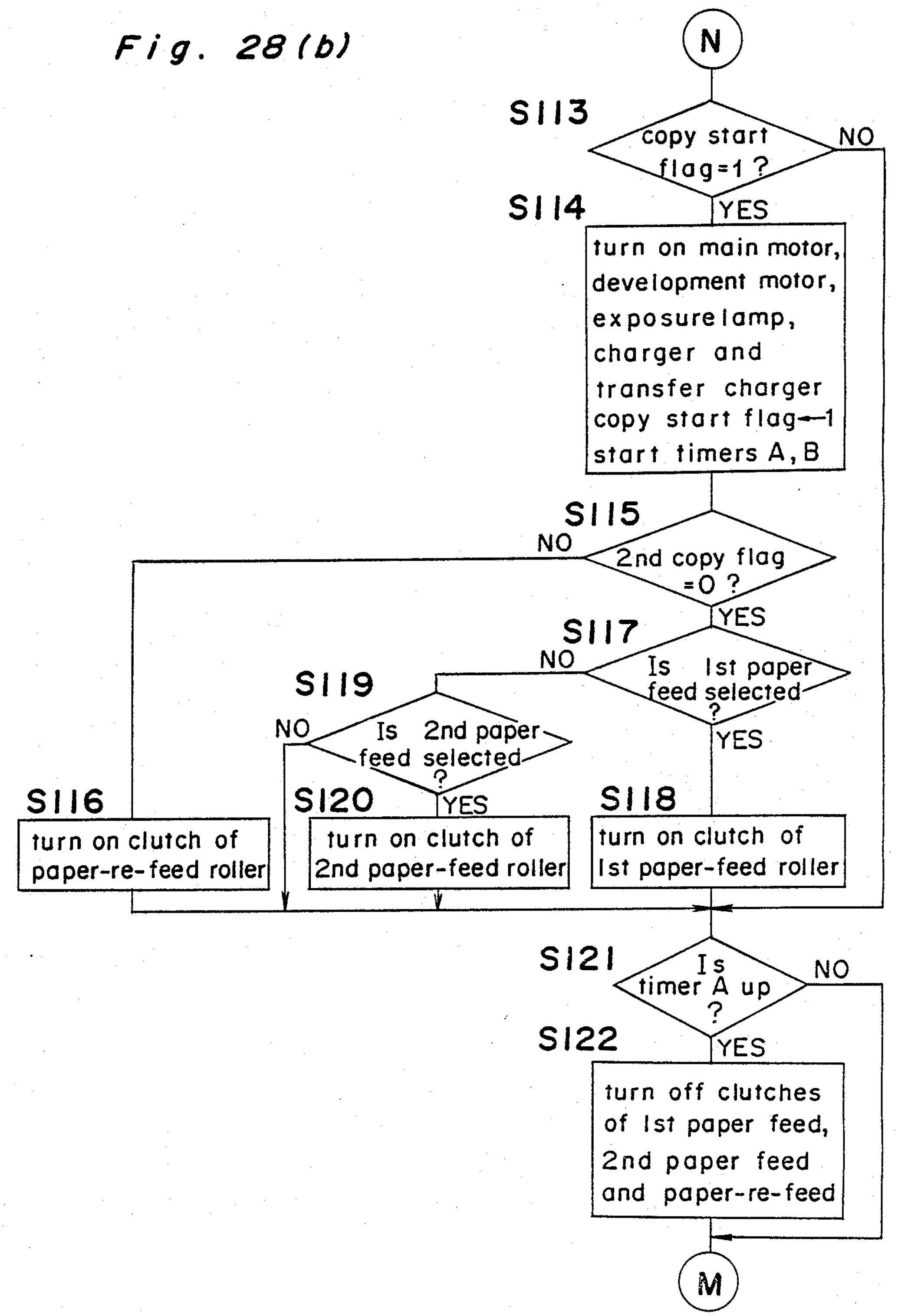
Figure 28C:
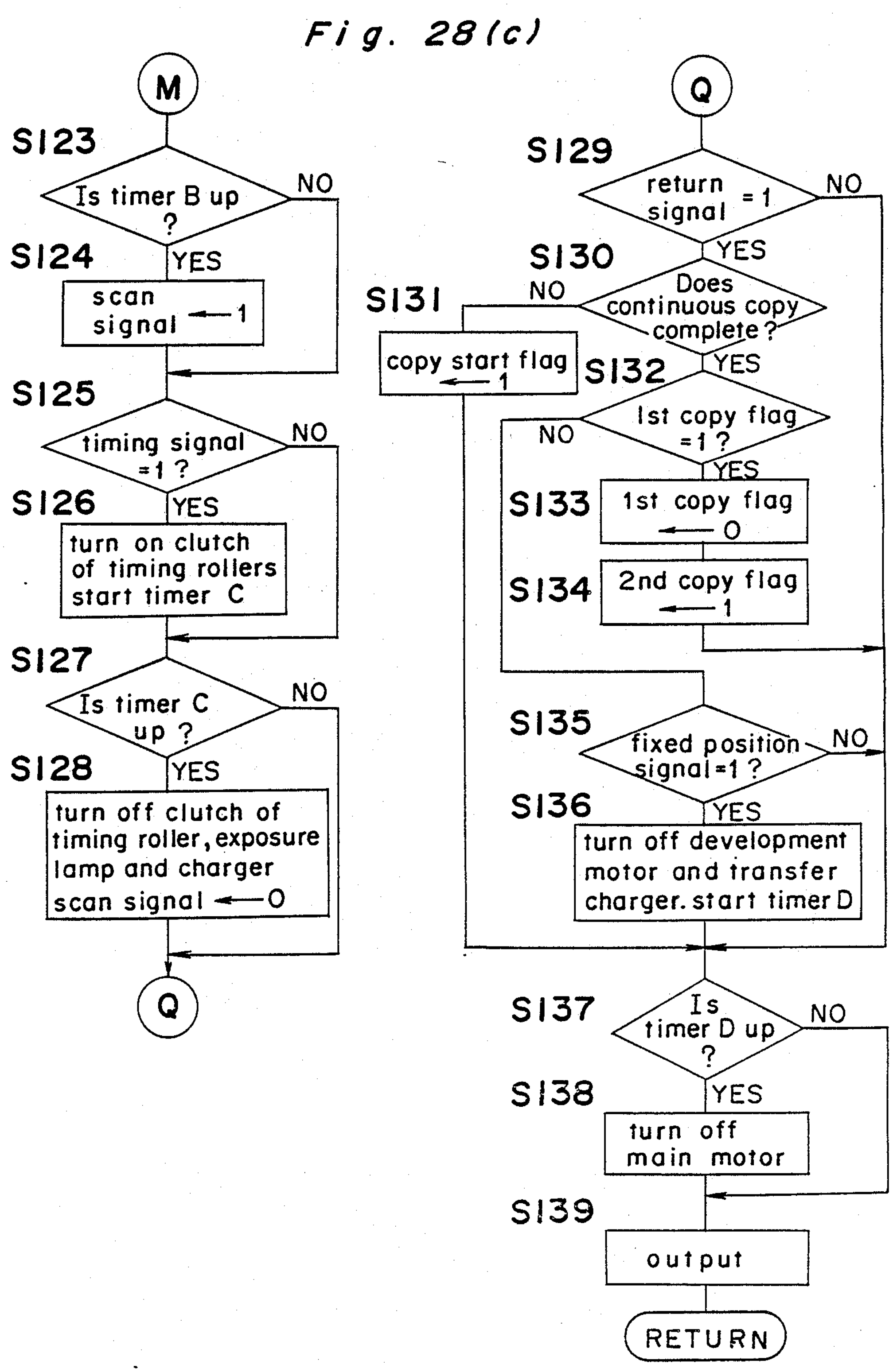

FIGS. 28(*a*), 28(*b*) and 28(*c*) show the copy action routine (step S8). First, it is decided if the LED 303*a* for displaying the duplex copy mode is turned off (step S100) and if the LED 304*a* for displaying the composite copy mode is lighted (step S101). If neither of the duplex copy and composite copy is selected ("YES" at both steps S100 and S101), a copy start flag is set at "1" (step S103) after an ON edge ("0"→"1") of a signal of the print key 301 is detected (step S102). Then, the program proceeds to step S109.

If the duplex copy mode is selected ("NO" at step S100), it is decided next if the duplex copy preparation flag has ben reset at "0" (step S104). This flag is reset at "0" at step S158 in the first copy preparation routine (FIG. 26). If the decision is "YES", after an ON edge of a signal of the print key 301 is detected (step S106), the copy-start flag is set at "1" (step S107), and the first copy flag is set at "1" (step S108). Then, the program proceeds to step S109. If the decision is "NO" at step S104, the program returns to the main routine because the next copy has not yet been prepared.

If the composite copy mode is selected ("YES" at step S100 and "NO" at step S101), it is decided next if the composite copy preparation flag is "0" (step S105). If the decision is "YES" or this flag has been reset at "0" at step S158 in the first copy preparation routine (FIG. 26), after o an ON edge ("0"→"1") of a signal of the print key 301 is detected (step S106), the copy-start flag is set at "1" (step S107), and the first copy flag is set at "1" (step S108). Then, the program proceeds to step S109. If the decision is "NO" at step S105, the program returns to the main routine because the next copy has not yet been prepared.

At step S109, it is decided if the second copy flag is "1". If the decision is "YES", it is decided next if the composite move flag is "0" (step S110). If the decision is "YES", the second copy flag is reset at "0"(step S111), and the copy start flag is set at "1" (step S112).

Next, if the copy start flag is "1" (step S113), the main motor M1, the development motor M2, the exposure lamp 3, the charger 12 and the transfer charger 14*a* are driven, the copy start flag is set at "1" and timers A and B are started (step S114). The timers A and B are used for the control of the driving time of the clutch of the paper feed roller and for the control of the start of scan, respectively.

It is decided next if the second copy flag is "0" or not (step S115). If the decision is "NO", the clutch of the paper-re-feed roller 61 is turned on (step S116). If the decision at step S115 is "YES", it is decided next if the first paper feeding means is selected or not (step P117). If the first paper-feeding means 31 is selected (step S117), the clutch of the means 31 is actuated (step S118). If the second (lower) paper-feed device 32 is selected (step S119), the clutch of the means 32 is actuated (step S120).

Then, if the timer A is up (step S121), the clutches of the paper-feed rollers 33, 34 and 61 are stopped (step S122).

Next, if the timer B is up (step S123), the scan motor M3 is actuated so as to start the scan action (step S124). After the timer B is up, the internal interruption routine (FIG. 31) is carried out and a data is written.

Then, if the timing signal is received during the scan action (step S125), the clutch of timing rollers 48 is actuated and a timer C for the control of the timing rollers 48 is started (step S126). The timing rollers 48 feed a paper to the photoconductor drum 11 in synchronization with the image.

Next, if the timer C is up (step S127), the charger 16, the scan motor M3 and the clutch of the timing rollers 48 are stopped (step S128). The value of the timer C can be varied according to the size of a copy paper.

Then, if the optical system 1 begins to return (step S129), it is decided if continuous copy completes (step S130). If the decision is "NO", the copy start flag is set at "1" (step S131). If the decision at step S131 is "YES", it is decided next if the first copy flag is "1"(step S132). This flag is set at "1" at step S108 when either of the duplex copy or the composite copy is performed. If the decision at step S132 is "YES", the first copy flag is reset at "0" (step S133) and the second copy flag is set at "1" (step S134). If the continuous copy has been completed ("YES" at step S130) and the first copy flag is reset at "1", after the optical system 1 returns to the start position to turn on the fixed position switch 73 (step S135), the development motor M2 and the transfer charger 7 are stopped and a timer D for auto-shut is started (step S136).

Next, if the timer D is up (step S137), the main motor M1 is stopped (step S138).

Finally, results obtained by various processings are outputted (step S139).

The timers A to D used in the above-mentioned flows are digital timers which are programmed so as to count up by one when individual actions of the copy routine have been carried out in predetermined time-interval set in the internal timer.

Figure 29:
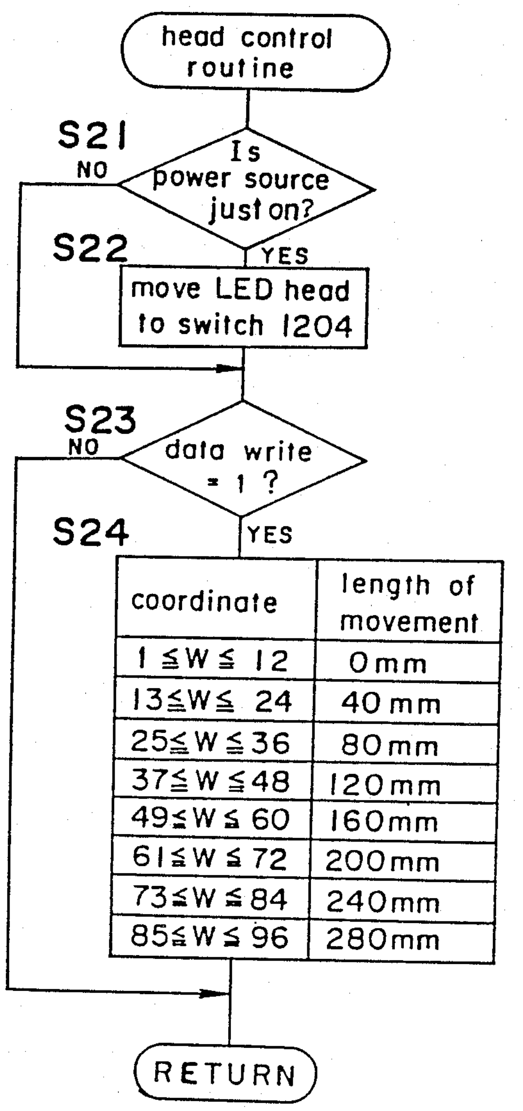
FIG. 29 is a flowchart of head control routine.

FIG. 29 shows the head control routine (step S9). If the electric power source is just supplied (step S21), the LED head 1201 is moved to an end till either one of the switches 1204 is turned on (step S22). Then, if the data-write signal becomes "1" (step S23), the LED head 1201 is moved by an amount shown in the Table according to a coordinate W of a region within which the data is to be written in parallel to the axial direction of the drum 11 (step S24). For example, if the coordinate W is in the region between the first and twelfth squares (see FIG. 15), the LED head 1201 should be held at its start position and, therefore, the distance of the movement of the LED head 1201 is set equal to zero. If the coordinate W is in the region between 13th and 24th, the LED head 1201 is moved by 40 mm being equal to the length of the LED head 1201 in the axial direction because the writing position of data should be moved to the next row (second row).

Figure 30:
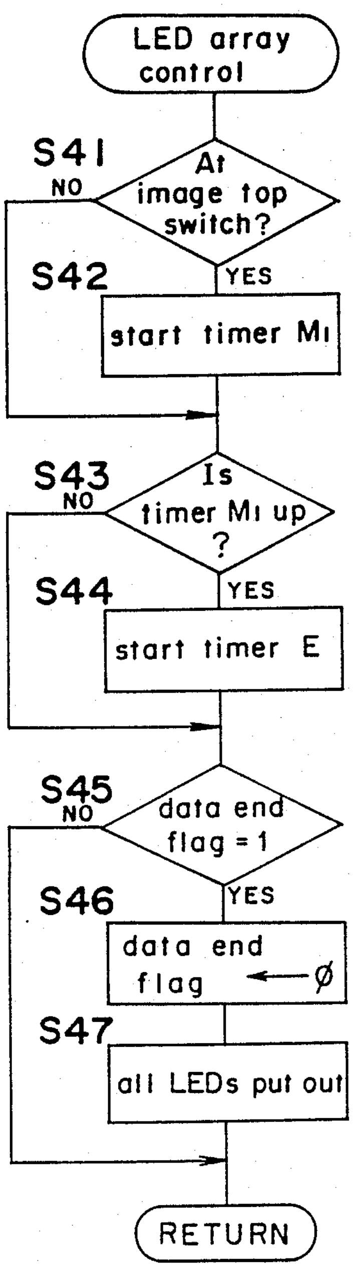
FIG. 30 is a flowchart of LED array control routine.

FIG. 30 shows a flow-chart of the LED array control routine (step S11). If the scanner of the optical system 1 turns on the switch 73 which locates at a position in correspondence with the top of image area on the platen glass 2 (step S41), a timer M1 is started (step S42). The timer M1 is used as a timer for indicating a timing to start the actuation of the LED head 1201 after passing the top of the image area. For example, if the writing area is designated to the fourth row, the value of the timer M1 is at a value obtained by following calculation 40 mm $\times$(4 set- 1) / scan speed (wherein 40 mm is the length of one square).

If the timer M1 is up (step S43), another timer E is started (step S44). When an interruption takes place after the timer E is up (see FIG. 31), a writing routine with use of the editor 2000 is started. The value of the timer E designates a lighting time per one dot data with respect to individual LEDs of the LED array 1202. Because the width of an LED is equal to 1 mm in this embodiment, the value is set to 1 mm / drum speed or a time in that an LED illuminates by one unit length of 1 mm measured on the photoconductor drum 11. Thus, if an LED of the LED array 1202 is lighted for one unit of time, a square pattern of 1 mm $\times$1 mm is erased.

Figure 31:
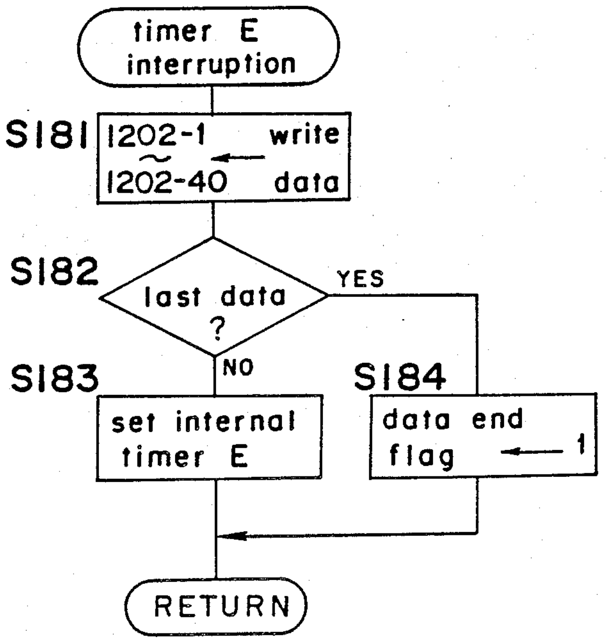
FIG. 31 is a flowchart of timer E interruption-handling.

If the data-end flag which designates the completion of data writing becomes "1" in the timer interruption routine shown in FIG. 31 (step S45), the data end flag is reset at "0" because all data have been written within the area of 40 mm (step S46), and all LEDs are turned off (step S47).

FIG. 31 shows the internal interruption routine which is executed after the timer E is up. If the count of the timer E is completed, an internal interruption occurs. Then, each LED of Nos. 1 to 40 of the LED array 1202 is driven or lighted according to data sent from the third CPU 2300 (step S181). If the data is not the last one ("0" at step S182), the timer E is set again (step S183) and, if it is the last one, the data end flag is set at "1" (step S184). If the internal timer E is not set, this interruption will not take place and the interruption process is completed.

Figure 32:
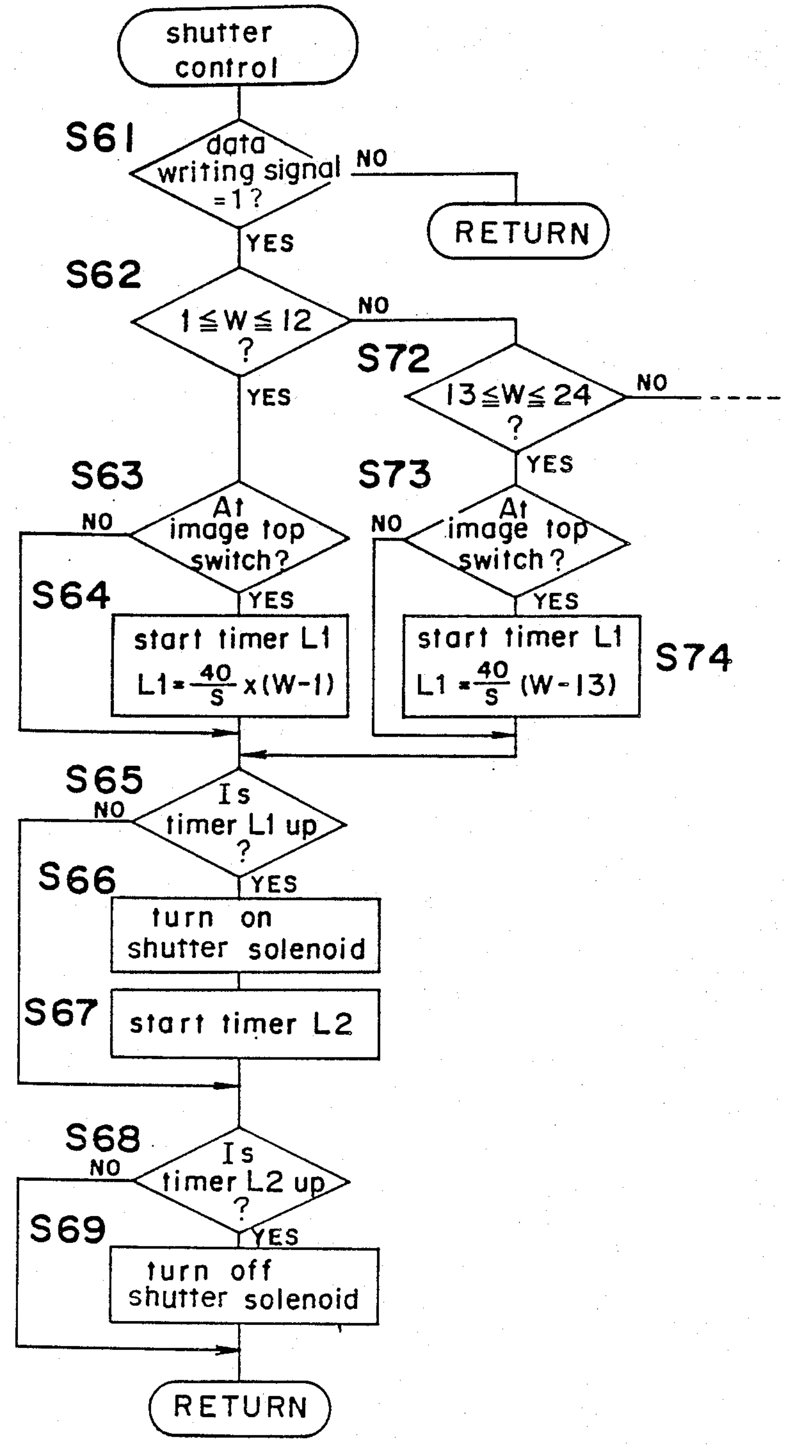
FIGS. 32 and 33 are flowcharts of shading control routine.

FIG. 32 shows a flow-chart of the shutter control routine (step S12) with use of the shutter 1206, wherein a timer L1 is used for opening the light path for the document image from the top thereof to a designated data writing position W and another timer L2 is used for counting a predetermined open time of the shutter 1206.

If a data writing signal is "1" (step S61), the shutter solenoid is turned on as will be explained below. If the coordinate W of the data writing data position is between 1 and 12 (step S62), the timer L1 of $(W-1)\times 40$mm/scan speed(s) is started (step S64) after the switch 73 is turned on at the top of the document image (step S63). If the timer L1 is up (step S65), the shutter solenoid is turned on to shut the light path (step S66) and the timer L2 having a set time of 40mm/scan speed is started (step S67). After the timer L2 is up (step S68), the shutter solenoid is turned off (step S69). Other rows from the 13th to 24th to those from the 85th to 96th are also processed similarly except the setting of the value of the timer L1.

Figure 33:
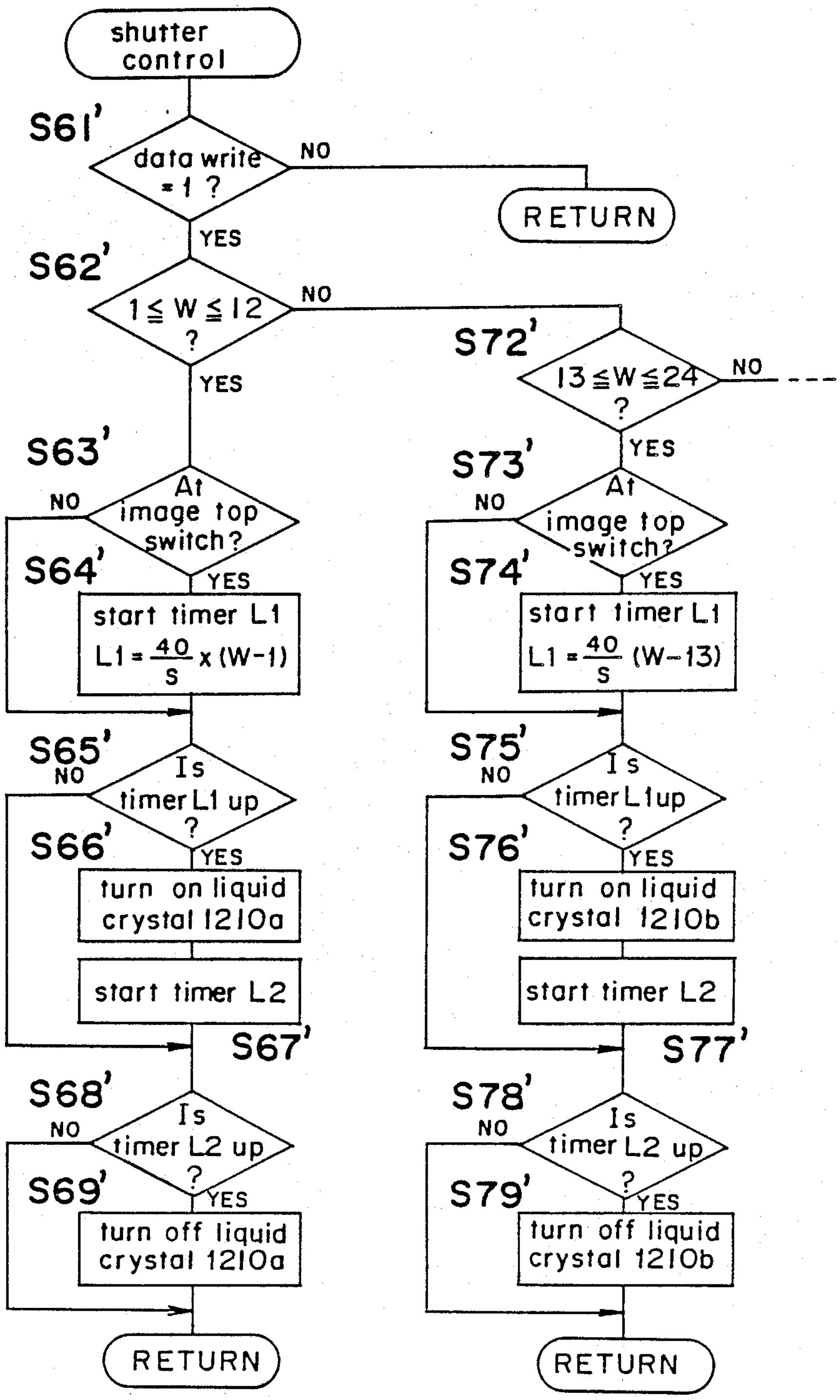

FIG. 33 shows another shutter control routine (step S12) with use of a liquid crystal shutter 1210. This routine is similar to that shown in FIG. 32 with use of the mechanical shutter 1206.

If the data writing signal is "1" (step S61'), one of liquid crystals 1210*a* to 1210*h* of the shutter 1210 is turned on according to the value of the coordinate W. If the coordinate W is between 1 and 12 (step S62'), the timer L1 of $(W-1)\times 40$ mm/scan speed is started (step S64') after the switch 73 is turned on at the top of an image (step S63'). If the timer L1 for the coordinate W is up (step S65'), the liquid crystal 1210*a* is turned on (step S66') and the timer L2 having a set time of 40 mm/scan speed is started (step S67'). When the timer L2 is up (step S68'), the liquid crystal 1210*a* is turned off (step S69'). Other rows from the 13th to 24th to those from the 85th to 96th are also processed similarly except a corresponding liquid crystal and the setting of the value of the timer L1.

Figure 34:
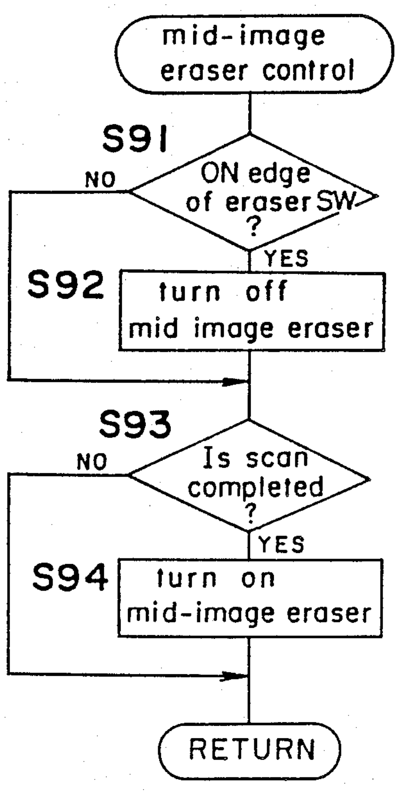
FIG. 34 is a flowchart of mid-image eraser control routine.

FIG. 34 shows the mid-image eraser control routine (step S13). If the first scanner of the optical system 1 turns on the switch 72 for erasing (step S91), the mid-image eraser 1100 is turned off (step S92). When the scan is completed (step S93), the mid-image eraser 1100 is turned on (step S94).

(j) The control of editor

Figure 35:
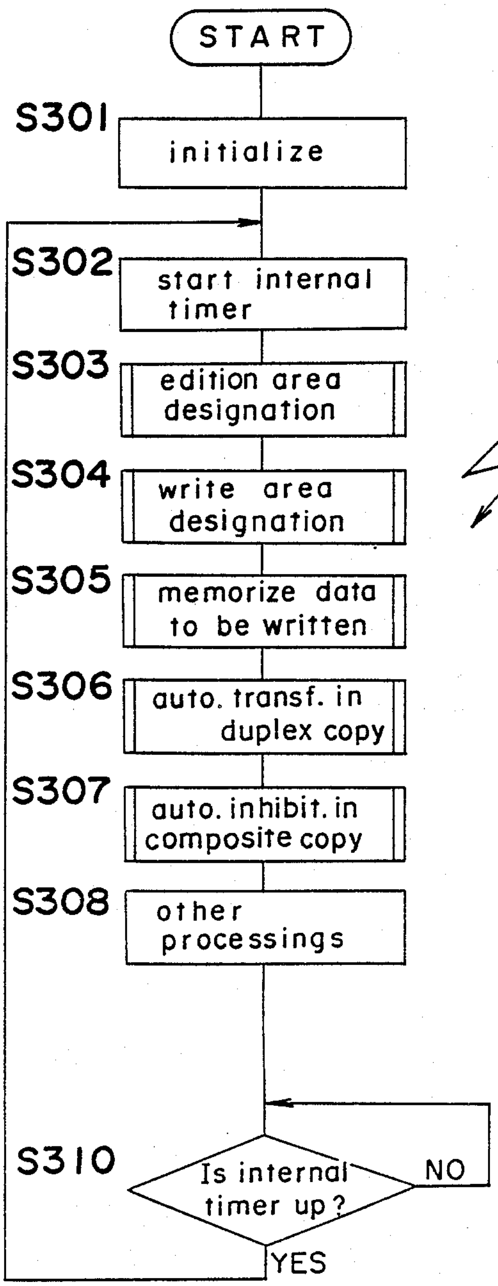
FIG. 35 is a flowchart of the main flow of an editor.

FIG. 35 shows the main flow of the third CPU 2300 for controlling the editor 2000. If the third CPU 2300 is reset and the program starts, the third CPU 2300 is initialized, for example, by clearing RAM 2151 and setting various registers, and the editor 2000 is set in the initial mode (step S301) Next, an internal timer whose value is set beforehand in the initializing process (step S301) is started (step S302).

Then, following subroutines shown in the flowchart are called successively: a subroutine for designating an edition area (step S303), a subroutine for designating data writing area (step S304), a subroutine for memorizing data to be written (step S305), a subroutine for automatic transformation of writing position in the duplex copy mode (step S306), a subroutine for inhibiting data writing in the composite copy (step S307), and a subroutine for other processings (step S308).

After all subroutines have completed, one routine of this flow is completed when the internal timer is up (step S310). The time interval of this routine is used for counting various timers used in respective subroutines. In other words, the end of each timer is determined by counting the number of processing of this routine.

Figure 36:
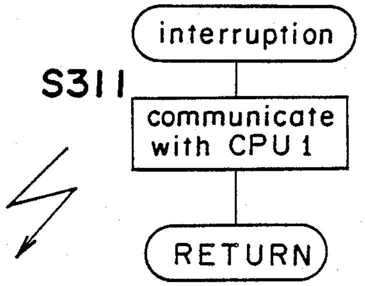
FIG. 36 is a flowchart of interruption-handling routine.

The data communication with the first CPU 201 is executed according to an interruption request (step S311) from the first CPU 201 by an interruption routine shown in FIG. 36 irrespectively of the main routine.

Figure 37:
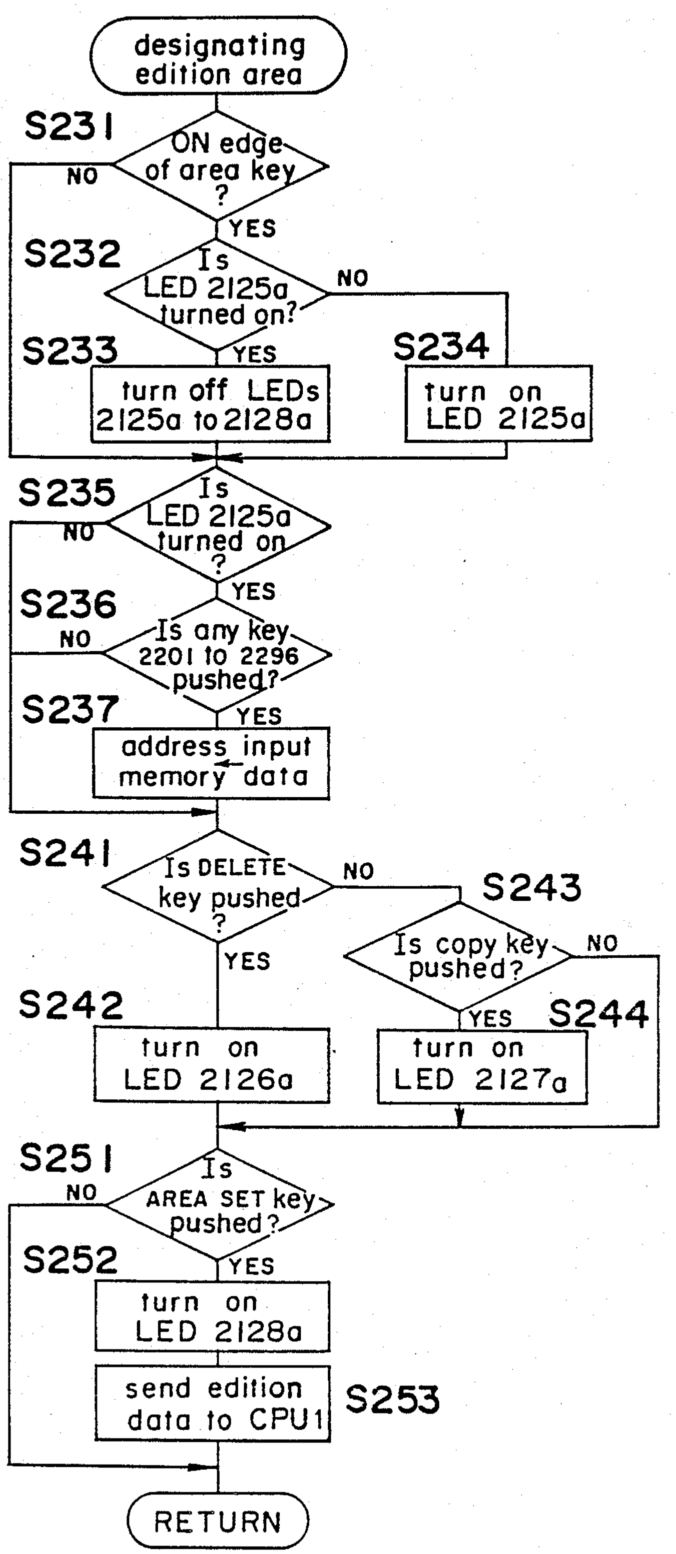
FIG. 37 is a flowchart of specifying edition area.

FIG. 37 shows a flowchart for designating an edition area (step S203). If the LED 2125*a* is lighted (step S232) at an "ON" edge ("0"→"1") of a signal of the AREA key 2125 (step S231), the LEDs 2125*a* to 2128*a* are turned off (step S233). If the LED 2125*a* is turned off (step S232) at an "ON" edge of a signal of the AREA key 2125 (step S231), the LED 2125*a* is lighted (step S234).

Next, if any of the keys 2201 to 2296 on the panel 2200 of the editor 2000 is pushed (step S236) when the LED 2125*a* is lighted (step S235) or if the editor 2000 is in a mode for entering coordinates of the edition area, the input data of the coordinates are stored in an address memory (step S237).

Then, if the DELETE key 2126 or the COPY key 2127 is pushed (step S241, S243), the LED 2126*a* or 2127*a* is lighted (step S242, S244).

If the AREA SET key 2128 is pushed (step S251) after all data have been entered, the LED 2128*a* is lighted at an "ON" edge of the signal of the AREA SET key 2128 (step S252) and the entry data for writing data such as coordinates, designation of deletion or copy and so on are sent to the first CPU 201 (step S253).

Figure 38:
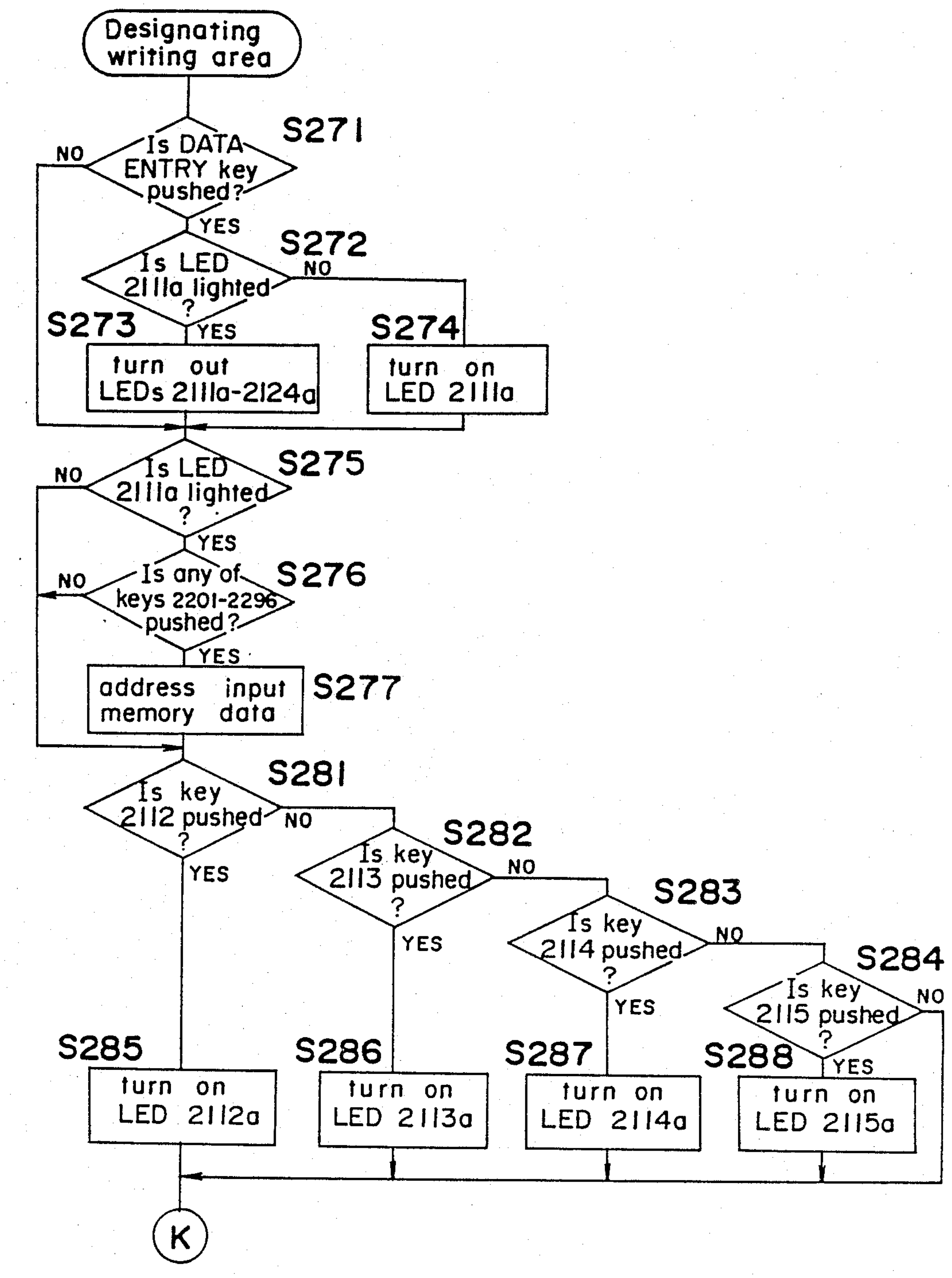
FIGS. 38 (*a*) and (*b*) are flowcharts of designating a data writing area.
Figure 38B:
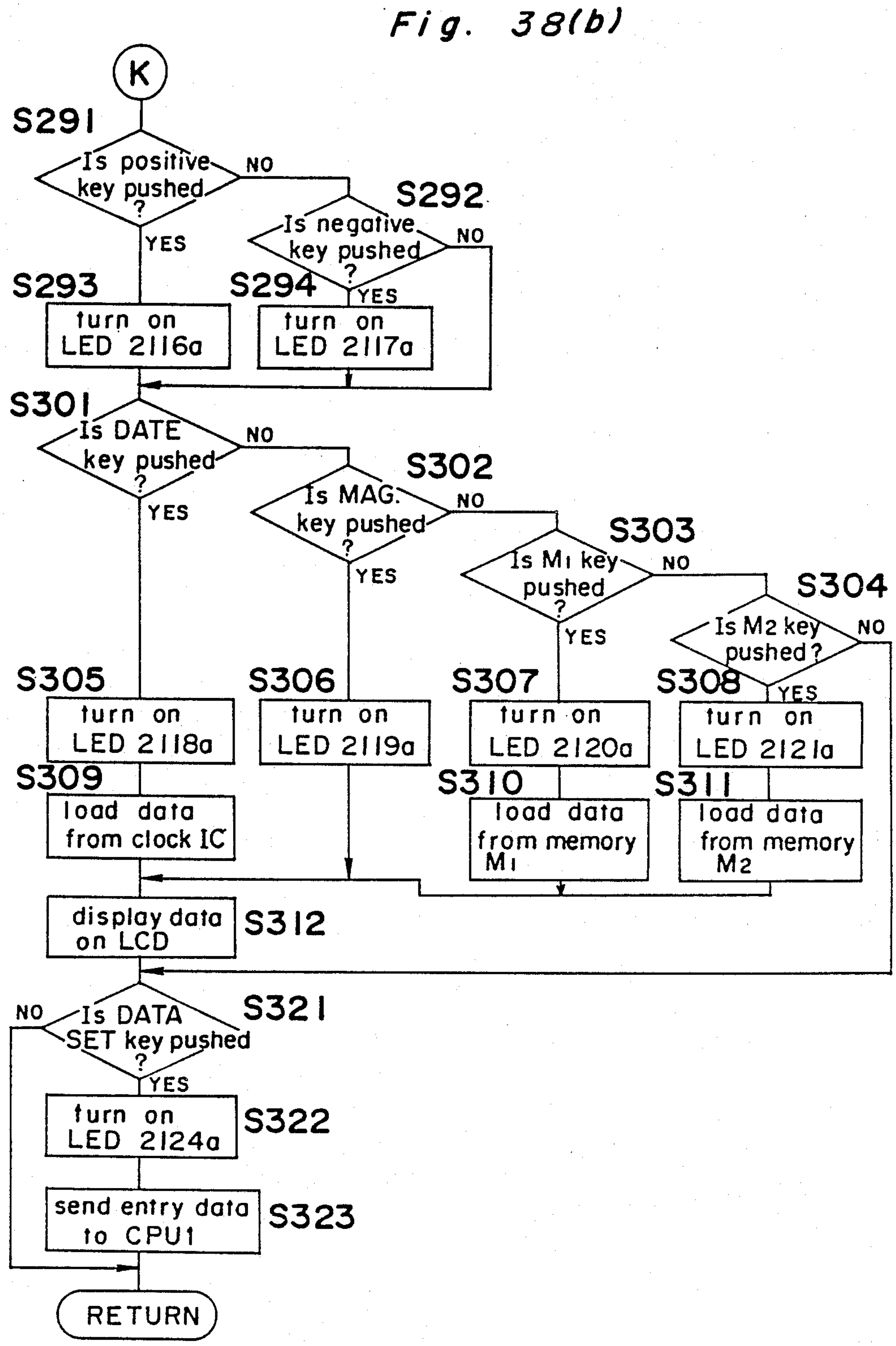

FIGS. 38(*a*) and 38(*b*) show a flowchart for designating a data writing area (step S204). If the LED 2111*a* is lighted (step S272) at an "ON" edge of a signal of the DATA ENTRY key 2111 (step S271), the LEDs 2111*a* to 2124*a* are turned off (step S273). On the other hand, if the LED 2111*a* is turned off (step S272) at an "ON" edge of a signal of the DATA ENTRY key 2111 (step S273), the LED 2111*a* is turned on (step S274).

Next, if either one of keys 2201 to 2296 on the panel 2100 of the editor 2000 is pushed (step S276) when the LED 2111*a* is lighted (step S275), the coordinate of the key is stored in the address memory as data regarding the data writing area (step S277).

Then, if either one of the keys 2112 to 2125 for designating a writing direction (normal, right, reverse, left) of the data is pushed (steps S281 to S284), the LED 2112*a* to 2115*a* in correspondence to the pushed key is turned on (steps S285 to S288).

Next, if the positive copy key 2116 is pushed (step S291), the LED 2116*a* is lighted (step S293), while if the negative copy key 2117 is pushed (step S292), the LED 2117*a* is lighted (step S294).

If either one of the DATE key 2118, the MAGNIFICATION key 2119, the M1 key 2120 and the M2 key 2121 for designating the kind of the entry data is pushed (steps S301 to S304), either one of LEDs 2118*a* to 2121*a* in correspondence to the pushed key is lighted (steps S305 to S308). Further, in the case of the DATE key 2118, the data of date obtained from the clock IC 2150 with a backup battery is loaded (step S309), and in cases of the M1 and M2 keys 2120 and 2121, an arbitrary data being set beforehand in memories M1 and M2 are loaded from the memory 2151 with a backup battery, respectively (step S310, S311). Then, the content of the input data is displayed on the liquid crystal display (LCD) 2100 (step S312).

Next, the DATA SET key 2124 is pushed after completing data entry, the LED 2124*a* is turned on at an "ON" edge of the DATA SET key 2124 (step S322) and data such as coordinates, writing direction and the like are sent to the first CPU 201 (step S323).

Figure 39:
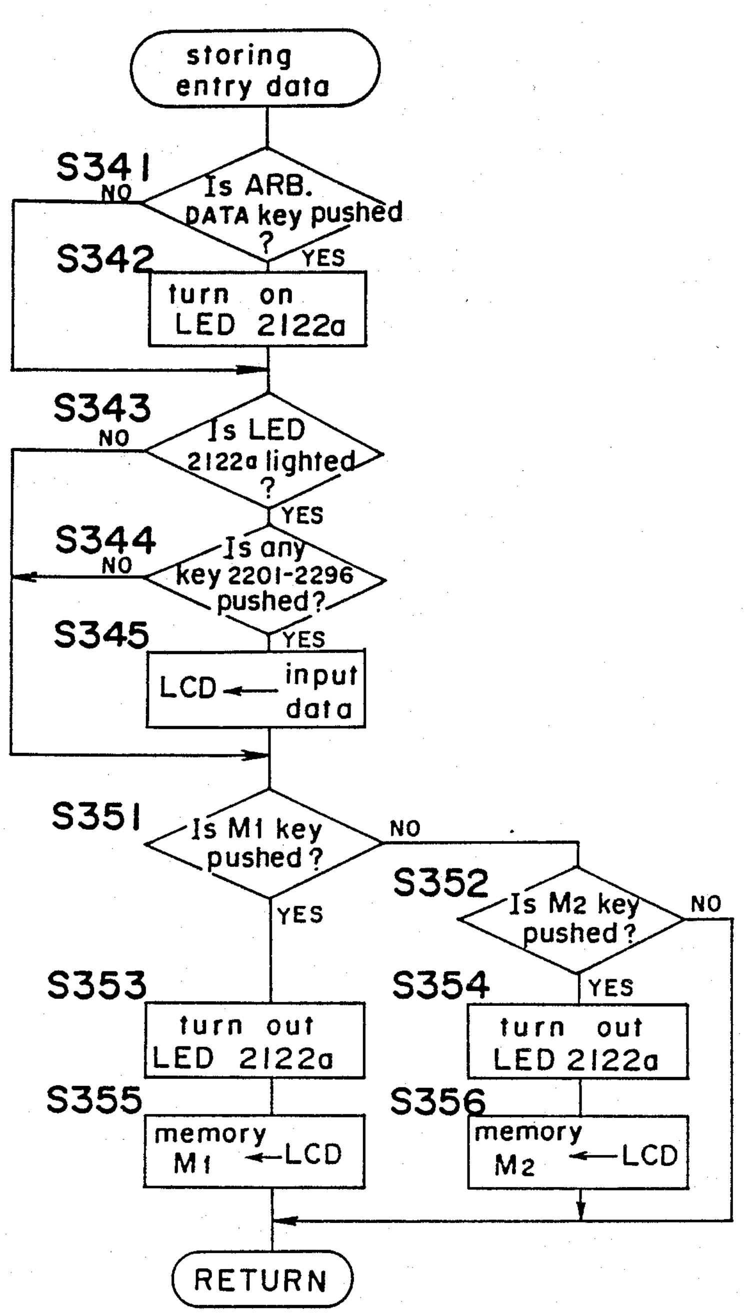
FIG. 39 is a flowchart of storing entry data.

FIG. 39 shows a flowchart for storing entry data (step S205). At an "ON" edge of the ARBITRARY DATA key 2122 (step S341), the LED 2122*a* is turned on (step S342). If either one of the keys 2201 to 2296 on the panel 2200 is pushed (step S344) when the LED 2122*a* is lighted (step S343) or the editor 2000 is in a mode for entering characters as an arbitrary data, the input data is transformed according to characters of the character panel shown in FIG. 16 so as to display on the liquid crystal display 2110 successively (step S345).

Next, if the M1 or M2 key 2170, 2121 is pushed (step S351 or S352), the LED 2122*a* is turned off (step S353 or S354), and the data displayed on the liquid crystal display 2110 is stored in the memory M1 or M2 of the memory 2151 (step S356 and S357). Because the memory 2151 is backed up by a battery, the data is kept nonvolatile after the storing.

Figure 40:
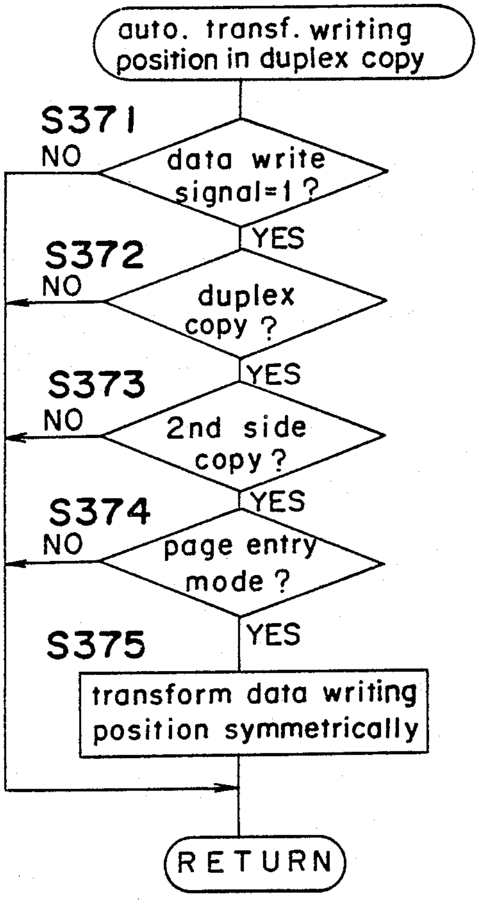
FIG. 40 is a flowchart of automatic transformation of duplex copy writing position in the duplex copy mode.
Figure 41:
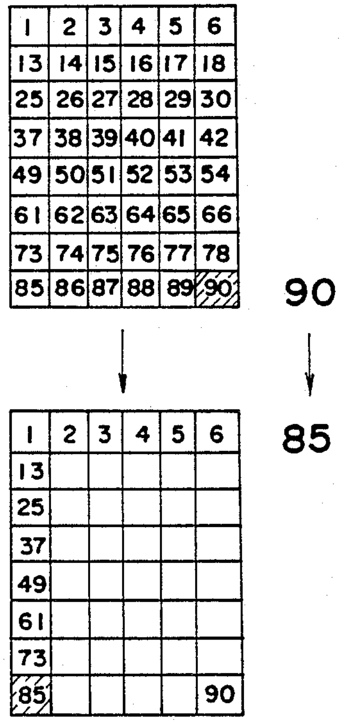
FIG. 41 is a diagram showing a manner of the automatic transformation, of data writing position in duplex copy.

FIG. 40 shows a flowchart the automatic transformation routine regarding data writing position in duplex copy mode (step S306 of FIG. 35). If following three conditions are satisfied, namely, the data write signal is "1" (step S371), the second side is prepared to copy in the duplex copy mode (step S372 and S373) and the page entry mode is selected (step S374). The data-writing position of the second side is transformed into a symmetrical position to that on the first side (step S375). For example, if a writing position of page data on the first side of a paper of A4 size is designated at 90th block as shown in FIG. 41, the data-write position on the second side of the paper is transformed automatically into a position (the 85th block) symmetric with respect to the copy center line of the paper.

Figure 42:
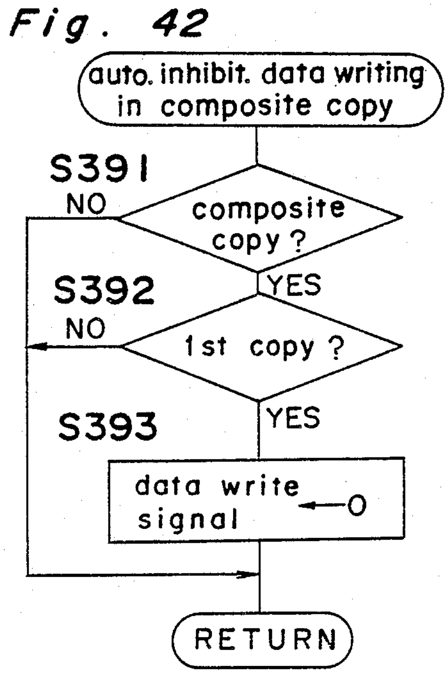
FIG. 42 is a flowchart of automatic transformation of data writing position in the composite copy mode.

FIG. 42 shows a flowchart the automatic inhibition routine for inhibiting data writing upon the first copy in the composite copy mode (step S308 of FIG. 35). If the copy under processing is the first copy (step S392) in the composite copy mode (step S391), the data-write signal is reset at zero in order to inhibit data-writing (step S393) even if the data-writing mode is selected. Although the data writing is inhibited upon the first copy in the composite copy mode in the preferred embodiment shown in FIG. 42, it is possible to write the data upon the first copy and to inhibit the data writing upon the second copy.

In a composite copy mode wherein three or more copyings are carried out with respect to the same side of a paper, the data writing is executed only once among them.

This invention may be embodied in still other ways without departing from the spirit of essential characters thereof. The preferred embodiments described herein are therefore illustrative and not restrictive, the scope of the invention being indicated by the appended claims and all variations which come within the meaning of the claims are intended to be embraced herein.

What is claimed is:

1. A copy machine comprising:

a photoconductor;

a first exposure means for exposing a primary image on said photoconductor;

a second exposure means for exposing a secondary image on said photoconductor, said second means being arranged so that an exposure position on said photoconductor is changeable;

a duplex copying machine for transferring a first primary image and a first secondary image onto a first side of a sheet and then, transferring a second primary image and a second secondary image onto a second side of the same sheet after visualizing those images, and a control means for automatically changing the exposure position of said second exposure means dependent which on side of the sheet the images are to be transferred in such a manner that said first secondary image is formed at a first position on the first side of the sheet and said second secondary image is formed at a second position on the second side of the sheet, said first position being different from said second position.

2. A copy machine according to claim 1, wherein said primary image to be exposed by said first exposure means is a document image and said secondary image to be exposed by said second exposure means is an image representing a page number.

3. A copy machine according to claim 1, wherein said primary image to be exposed by said first exposure means is a document image and said secondary image to be exposed by said second exposure means is a date.

4. A copy machine according to claim 1, wherein said second exposure means comprises a writing head of light-emitting diode elements for exposing the photoconductor by selectively radiating one or more light-emitting diode elements and a shutter means for preventing the exposure on said photoconductor by said first exposure means on the exposure area by said second exposure means.

5. A copy machine according to claim 1, wherein said second position is set at a position symmetric to the first position with respect to a center line of the sheet.

6. An image forming apparatus for forming first document image on a first side of a sheet and, thereafter, forming second document image on a second side of the same sheet including means for forming special information on the sheet, said means being capable of adjusting a position at which said special information is to be formed, and control means for automatically changing the position dependent on which side of the sheet said special information is to be formed in such a manner that such special information is formed at a first predetermined position upon forming said first document image on said first side of the sheet and that said special information is formed at second predetermined position being different from said first predetermined position upon forming said second document image on said second side of the sheet.

7. An image forming apparatus according to claim 6 in which said special information is a page number.

8. An image forming apparatus according to claim 6 in which said special information is a date.

9. An image forming apparatus according to claim 6 in which said special information is a combination of characters and/or symbols.

10. An image forming apparatus according to claim 6 in which said second predetermined position is set at a position symmetric to said first predetermined position with respect to a center line of the sheet.

11. An image forming apparatus for forming images on first and second sides of a sheet which comprises:

means for forming individual special information on said first and second sides of said sheet, said means being capable of adjusting a position at which said special information is to be formed; and means for automatically changing the position dependent on which side of the sheet said special information is to be formed.

12. An image forming apparatus for forming first document image on one side of a sheet and forming second document image oh the same side of said sheet successively, comprising:

means for forming predetermined information different from said first and second document images, and control means for inhibiting operation of said means upon forming either one of said first and second document images and for operating said means upon forming the other document image.

13. An image forming apparatus according to claim 12 in which said predetermined information is a page number.

14. An image forming apparatus according to claim 12 in which said predetermined information is a date.

15. An image forming apparatus according to claim 12 in which said predetermined information is a combination of characters and/or symbols.

16. A copy machine for executing multiple image forming on an identical side of a sheet which comprises:

means for forming special information on said identical side of a sheet and a control means for operating said means only one time during said multiple image forming.

17. A copy machine comprising:

a photoconductor:

a first exposure mans for exposing a primary image on said photoconductor;

a second exposure means for exposing a secondary image on said photoconductor, said second means being arranged so that an exposure position on said photoconductor is changeable;

a duplex copying means for transferring a first primary image and a first secondary image onto a first side of a sheet and then, transferring a second primary image and a second secondary image onto a second side of the same sheet after visualizing those images, and a control means for controlling said second exposure means in such a manner that said first secondary image is exposed at a first position on said photoconductor upon copying the first side of the sheet and said second secondary image is exposed at a second position on said photoconductor upon copying the second side of the sheet, said second position being different from said first position wherein a distance from the leading edge of the first side of the sheet to the first secondary image on the first side of the sheet is different from a distance from the leading edge of the second side of the sheet to the second secondary image on the second side of the sheet.

* * * * *